US006520228B1

(12) United States Patent
Kennedy et al.

(10) Patent No.: US 6,520,228 B1

(45) Date of Patent: Feb. 18, 2003

(54) POSITION-BASED INTEGRATED MOTION CONTROLLED CURVE SAWING

(75) Inventors: Joe B. Kennedy, Salmon Arm (CA); Roland Davyduke, Salmon Arm (CA); James G. Jackson, Salmon Arm (CA); James B. Hannebauer, Salmon Arm (CA); William R. Newnes, Salmon Arm (CA); Brian Stroud, Salmon Arm (CA); John Sergeant, Salmon Arm (CA)

(73) Assignee: CAE Inc., Salmon Arm (CA)

( * ) Notice: Subject to any disclaimer, the term of this patent is extended or adjusted under 35 U.S.C. 154(b) by 0 days.

(21) Appl. No.: 09/505,255

(22) Filed: Feb. 15, 2000

Related U.S. Application Data

(60) Continuation of application No. 09/211,047, filed on Dec. 15, 1998, now Pat. No. 6,039,098, which is a division of application No. 08/822,947, filed on Mar. 21, 1997, now Pat. No. 5,884,682.

(60) Provisional application No. 60/025,086, filed on Aug. 30, 1996, provisional application No. 60/015,825, filed on Apr. 17, 1996, and provisional application No. 60/013,803, filed on Mar. 21, 1996.

(51) Int. Cl.[7] ............................ B23Q 16/00; B27B 1/00

(52) U.S. Cl. .......................... 144/398; 144/3.1; 144/39; 144/357; 144/369; 144/403; 83/76.8; 83/364; 83/367; 83/370; 700/167

(58) Field of Search ................................ 83/75.5, 76.8, 83/364, 367, 370, 368, 365; 144/3.1, 39, 41, 242.1, 356, 357, 367, 369, 382, 403, 404, 398; 700/167; 250/559.29; 382/171

(56) References Cited

U.S. PATENT DOCUMENTS

| | | | |
|---|---|---|---|
| 5,400,842 | A | 3/1995 | Brisson |
| 5,960,104 | A | 9/1999 | Conners et al. |

FOREIGN PATENT DOCUMENTS

| | | | |
|---|---|---|---|
| GB | 2 068 294 | A | 8/1981 |

*Primary Examiner*—W. Donald Bray
(74) *Attorney, Agent, or Firm*—Antony C. Edwards

(57) ABSTRACT

A method of position-based integrated motion controlled curve sawing includes the steps of: transporting a curved workpiece in a downstream direction on a transfer, and monitoring position of the workpiece on the transfer, scanning the workpiece through an upstream scanner to measure workpiece profiles in spaced apart array, along a surface of the workpiece and communicating the workpiece profiles to a digital processor, computing by the digital processor, a high order polynomial smoothing curve fitted to the array of workpiece profiles of the curved workpiece, and adjusting the smoothing curve for cutting machine constraints of downstream motion controlled cutting devices to generate an adjusted curve generating unique position cams unique to the workpiece from the adjusted curve for optimized cutting by the cutting devices along a tool path corresponding to the position cams, sequencing the transfer and the workpiece with the cutting devices, and sequencing the unique position cams corresponding to the workpiece to match the position of the workpiece feeding the workpiece, on the transfer, longitudinally into cutting engagement with the cutting devices, and actively relatively positioning the workpiece and the cutting devices relative to each other according to a time-based servo loop updated recalculation, based on said workpiece position, of cutting engagement target position as the workpiece is fed longitudinally so as to position the cutting engagement of the cutting devices along the tool path.

19 Claims, 24 Drawing Sheets

1. Generate Polynomial

2. Calculate Discrete Points

3. Apply Machine Constraints

4. Re-generate Polynomial

POSITION-BASED INTEGRATED MOTION CONTROLLED CURVE SAWING

CROSS REFERENCE TO RELATED APPLICATION

This application is a continuation of U.S. patent application Ser. No. 09/211,047 filed Dec. 15, 1998 now U.S. Pat. No. 6,039,098 which is a division of U.S. patent application Ser. No. 08/822,947 filed Mar. 21, 1997 now U.S. Pat. No. 5,884,682 which claimed priority from U.S. patent application No. 60/013,803 filed Mar. 21, 1996, 60/015,825 filed Apr. 17, 1996 and No. 60/025,086 filed Aug. 30, 1996.

FIELD OF THE INVENTION

This invention relates to a method and a device for sawing lumber from workpieces such as cants, and in particular relates to a cant feeding system, for the breakdown of a two-sided cant according to an optimized profile.

BACKGROUND

It is known that in today's competitive sawmill environment, it is desirable to quickly process non-straight lumber so as to recover the maximum volume of cut lumber possible from a log or cant. For non-straight lumber, volume optimization means that, with reference to a fixed frame of reference, either the non-straight lumber is moved relative to a gangsaw of circular saws, or the gangsaw is moved relative to the lumber, or a combination of both, so that the saws in the gangsaw may cut an optimized non-straight path along the lumber, so-called curve-sawing.

Advances in digital processing technology and non-contact scanning technology have made possible in the present invention, an orchestrated approach to curve sawing involving a plurality of coordinated machine centers or devices for optimized curve sawing having benefits over the prior art.

A canted log, or "cant", by definition has first and second opposed cut planar faces. In the prior art, cants were fed linearly through a profiler or gang saw so as to produce at least a third planar face either approximately p&allel to the center line of the cant, so called split taper sawing, or approximately parallel to one side of the cant, so called frill taper sawing; or at a slope somewhere between split and flill taper sawing. For straight cants, using these methods for volume recovery of the lumber can be close to optimal. However, logs often have a curvature and usually a curved log will be cut to a shorter length to minimize the loss of recovery due to this curvature. Consequently, in the prior art, various curve sawing techniques have been used to overcome this problem so that longer length lumber with higher recovery may be achieved.

Curve sawing typically uses a mechanical centering system that guides a cant into a secondary break-down machine with chipping heads or saws. This centering action results in the cant following a path very closely parallel to the center line of the cant, thus resulting in split taper chipping or sawing of the cant. Cants that are curve sawn by this technique generally produce longer, wider and stronger boards than is typically possible with a straight sawing technique where the cant has significant curvature.

Curve sawing techniques have also been applied to cut parallel to a curved face of a cant, i.e. full taper sawing. See for example Kenyan, U.S. Pat. No. 4,373,563 and Lundstrom, Canadian Patent No. 2,022,857. Both the Kenyan and Lundstrom devices use mechanical means to center the cant during curve sawing and thus disparities on the surface of the cant such as scars, knots, branch stubs and the like tend to disturb the machining operation and produce a "wave" in the cant. Also, cants subjected to these curve sawing techniques tend to have straight sections on each end of the cant. This results from the need to center the cam on more than one location through the machine. That is, when starting the cut the cant is centered by two or more centering assemblies until the cant engages anvils behind the chipping heads. When the cant has progressed to the point that the centering assemblies in front of the machine are no longer in contact, the cant is pulled through the remainder of the cut in a straight line. It has also been found that full taper curve sawing techniques, because the cut follows a line approximately parallel to the convex or concave surface of the cant, can only produce lumber that mimics these surfaces, and the shape produced may be unacceptably bowed.

Thus in the prior art, so called arc-sawing was developed. See for example U.S. Pat. Nos. 5,148,847 and 5,320,153. Arc sawing was developed to saw irregular swept cants in a radial arc. The technique employs an electronic evaluation and control unit to determine the best semi-circular arc solution to machine the cant, based, in part, on the cant profile information. Arc sawing techniques solve the mechanical centering problems encountered with curve sawing but limit the recovery possible from a cant by constraining the cut solution to a radial form.

Applicant is also aware of U.S. Pat. No. 4,373,563, U.S. Pat. No. 4,572,256, U.S. Pat. No. 4,690,188, U.S. Pat. No. 4,881,584, U.S. Pat. No. 5,320,153, U.S. Pat. No. 5,400,842 and U.S. Pat. No. 5,469,904; all designs that relate to the curve sawing of two-sided cants. Eklund, U.S. Pat. No. 4,548,247, teaches laterally translating chipping heads ahead of the gangsaws. Dutina, U.S. Pat. No. 4,599,929 teaches slewing and skewing of gangsaws for curve sawing. The U.S. Pat. Nos. 4,690,188 and 4,881,584 references teach a vertical arbor with an arching infeed having corresponding tilting saws and, in U.S. Pat. No. 4,881,584, non-active preset chip heads mounted to the sawbox.

Applicant is aware of U.S. Pat. No. 4,144,782 which issued to Lindstrom on Mar. 20, 1979 for a device entitled "Apparatus for Curved Sawing of Timber". Lindstrom teaches that when curve sawing a log, the log is positioned so as to feed the front end of the log into the saw with the center of the log exactly at the saw blade. In this manner the tangent of the curve line for the desired cut profile of the log extends, starting at the front end, parallel with the direction of the saw blade producing two blocks which are later dried to straighten and then re-sawn in a straight cutting gang.

It has been found that optimized lumber recovery is best obtained for most if not all cants if a unique modified polynomial cutting solution is determined for every cant. Thus for each cant a "best" curve is determined, which in some instances is merely a straight line parallel to the center line of the cant, and in other instances a complex curve that is only vaguely related to the physical surfaces of the cant.

Thus it is an object of the present invention to improve recovery of lumber from cants and in particular irregular or crooked cants by employing a "best" curve smoothing technique to produce a polynomial curve, which when modified according to machine constraints results in a unique cutting solution for each cant.

To achieve this objective, in a first embodiment, a two sided cant is positioned and accurately driven straight into an active curve sawing gang, which active chip heads directly in front of the saws, to produce the "best" curve which includes smoothing technology. In one embodiment, a machining center in the form of a profiler cuts at least a third and potentially a fourth vertical face from a cant according to an optimized curve so that the newly profiled face(s) on the cant can be accurately guided or driven into a subsequent curve sawing gang. The profiled cant reflects the "best" curve which includes smoothing technology to limit excessive angles caused by scars, knots and branch stubs; while the gang saw products reflect the previously calculated optimized cutting solution.

Due to an increased incidence of jamming of circular gang saw blades with curve sawing in general, it is another object of the present invention to orient the circular saw sawguides near the first contact point of the cant within the gang saw and still allow the sawguides to be rotated back away from the saw blades, thus allowing the saw blades to be removed more easily in the event of a cant becoming jammed than with other known curve sawing circular gang saws of the known type.

SUMMARY OF THE INVENTION

In all embodiments of the integrated motion controlled position-based curve sawing of the present invention, the method of position-based integrated motion controlled curve sawing includes the steps of: transporting a cured elongate workpiece, which may be a cant, in a downstream direction on a transfer means, monitoring, by monitoring means, the position of the workpiece on the transfer means, scanning the workpiece through an upstream scanner to measure workpiece profiles in spaced apart array along a surface of the workpiece, communicating, by communication means, the workpiece profiles to a digital processor, which may include an optimizer, a PLC and a motion controller, computing by the digital processor, a high order polynomial smoothing curve fitted to the array of workpiece profiles of the curved workpiece, adjusting the smoothing curve for cutting machine constraints of downstream motion controlled cutting devices to generate an adjusted curve, generating unique position cams unique to the workpiece from the adjusted curve for optimized cutting by the cutting devices along a tool path corresponding to the position cams, sequencing the transfer means and the workpiece with the cutting devices, sequencing the unique position cams corresponding to the workpiece to match the position of the workpiece, feeding the workpiece on the transfer means longitudinally into cutting engagement with the cutting devices, and actively relatively positioning, by selectively actuable positioning means, the workpiece and the cutting devices relative to each other according to a time-based servo loop updated recalculation, based on said workpiece position, of cutting engagement target position as the workpiece is fed longitudinally so as to position the cutting engagement of the cutting devices along the tool path.

Advantageously, the high order polynomial smoothing curve is an $n^{th}$ degree modified polynomial of the form $f(x)=a_n x^n+a_{n-1}x^{n-1}+ \ldots +a_1 x+a_0$, having co-efficient $a_n$ through $a_0$, and where the co-efficients $a_n$ through $a_0$ are generated by numerical processing to correspond to, and for fitting a smoothing curve along, the corresponding workpiece profiles.

In one aspect of the present invention, the method includes monitoring, by monitoring means cooperating with the digital processor, of loading of the cutting devices and actively adjusting the workpiece feed speed by a variable feed drive, so as to maximize the feed speed. In a further aspect, the method includes compensating for workpiece density in the adjusting of the feed speed or includes monitoring workpiece density, by a density monitor cooperating with the digital processor, and compensating for the density in the adjusting of the feed speed.

Advantageously, the monitoring of the position of the workpiece includes encoding, by an encoder, translational motion of the transfer means and communicating the encoding information to the digital processor. Further advantageously, the monitoring of workpiece position includes communicating trigger signals from an opposed pair of photoeyes, opposed on opposed sides of the transfer means, to the digital processor.

Summary of the First Mechanical Embodiment

The first mechanical embodiment consists of, first, an indexing transfer which temporarily holds a cant in a stationary position by a row of retractable duckers or pin stops, for regulated release of the cant onto a sequencing transfer. The sequencing transfer feeds the cant through a scanner, where the scanner reads the profile of the cant and sends the data to an optimizer. The scanner may be transverse or lineal.

An optimizing algorithm in the optimizer generates three dimensional models from the cant's measurements, calculates a complex "best" curve related to the intricate contours of the cant, and selects a breakdown solution including a cut description by position cams that represent the highest value combination of products which can be produced from the cant. Data is then transmitted to a programmable logic controller (PLC) that in turn sends motion control information related to the optimum breakdown solution to various machine centers to control the movement of the cant and the designated gangsaw products.

Immediately following the scanner is a sequencing transfer that also includes a plurality of rows of retractable duckers and/or pin stops that hold the cants temporarily for timed queued release so as to queue the cants for release onto a positioning device. The positioning device may be merely positioning pins or a fence for roughly centering the cant in front of the gangsaw, or may be a positioning table including positioners having retractable pins that center the cant in front of the gangsaw. The positioner pins retract, the positioning table feeds the cant via sharpchains and driven press rolls, straight into the combination active chipper and saw box.

The gangsaw uses a plurality of overhead pressrolls, and underside circulating sharpchain in the infeed area, with fixed split bedrolls in the infeed area and non-split bedrolls in the outfeed area. A plurality of overhead pressrolls hold the cant from the top and bottom by pressing down onto the flat surface of the cant thus pressing the cant between the lower infeed sharpchain (infeed only) and bedrolls and the overhead pressrolls, for feeding the cant straight into the gang saw. The chipping heads and the saws on the saw arbor may be actively skewed and translated, so as to follow the optimized curve sawing solution. In this fashion the cant moves in one direction only, and the chipping heads and the saws are actively motion controlled to cut along the curved path that has been determined by the optimizer. The chip heads move with the saws to create flat vertical sides on the cant so that there is no need to handle and chip slabs, and no need to install a curve forming canter before the gangsaw.

The chipping heads may be retracted or relieved out away from the preferred curved face of the cant so as to keep the cutting forces equal in the event of a bulge or flare in the thickness of the cant or to reduce motor loading. The use of active chipping heads in this manner allows creating a side board in what would be waste material in the prior art between an outermost saw and a chipping head in the instance where the bulge or flare is substantial enough to contain enough material in thickness and length to create an extra side board. The optimizer would prepare the system to accept the extra side board.

In summary, the active gangsaw of a first mechanical embodiment of the present invention comprises, in combination, an opposed pair of selectively translatable chipping heads co-operating with a gangsaw cluster, wherein the opposed pair of selectively translatable chipping heads are mounted to, and selectively translatable in a first direction relative to a selectively articulatable gangsaw carriage, wherein the first direction crosses a linear workpiece feed path wherealong workpieces may be linearly fed through the active gangsaw so as to pass between the opposed pair of selectively translatable chipping heads and through the gangsaw cluster, and wherein the gangsaw cluster is mounted to the gangsaw carriage and is selectively positionable linearly in the first direction and simultaneously rotatable about a generally vertical axis to thereby translate and skew the workpiece carriage relative to the workpiece feed path by selective positioning means acting on the gangsaw carriage.

Advantageously, the gangsaw carriage is selectively positionable linearly in said first direction by means of translation of said gangsaw carriage along linear rails or the like translation means mounted to a base, and is simultaneously rotatable about said generally vertical axis by means of rotation of said gangsaw carriage about a generally vertical shaft extending between said gangsaw carriage and said base.

Summary of the Second Mechanical Embodiment

The second mechanical embodiment consists of, first, an indexing transfer which temporarily holds a cant in a stationary position by a row of retractable duckers or pin stops, for regulated release onto a sequencing transfer. The sequencing transfer feeds the cart through a scanner, where the scanner measures the profile of the cant and sends the data to an optimizer.

An optimizing algorithm in the optimizer generates three dimensional models from the cant's measurements, calculates a complex "best" curve related to the interior contours of the cant, and selects a breakdown solution including a cut description by position cams that represents the highest value combination of products which can be produced from the cant. Data is then transmitted to a PLC that in turn sends motion control information related to the optimum breakdown solution to various machine centers to control the movement of the cant and the various devices hereinafter more fully described.

Immediately following the scanner is a sequencing transfer that also includes a plurality of rows of retractable duckers and/or pin stops that hold the cants temporarily for timed queued release so as to queue the cants for release onto a positioning device. The positioning device positions the cant in front of the gangsaw, and in some cases positions the cant in front of selected gangsaw zones that have been determined by the optimizer decision processor to provide the optimum breakdown solution.

A skew angle is calculated by the optimizer algorithm so that the positioning device presents the cant tangentially to the saws. If the positioning device is a skew bar, the skew bar pins retract, the rollcase feeds the cant into a pair of press rolls and then further into a chipper drum and an opposing chipper drum counter force roll. The chipper drum begins to chip and to form the optimized profile onto one side of the cant as the cant moves past it, while the opposing chipper drum roll counters the lateral force created by the chipper drum, to help to maintain the cants' direction of feed. The cant is driven toward the saws and contacts a steering roll mechanism adjacent the chipper drum in the direction of flow. The steering roll comes into contact with the face that has just been created by the chipper drum. The steering roll has an opposing crowder roll that maintains a force against the steering roll while being active so as to move in and out to conform to the rough side of the cant as it moves toward the saws. A guide roll is positioned to allow the cant to move up to the saws in the intended position. The guide roll is adjustable, and also capable of steering when the configuration requires it to steer for different saw configuration and lumber sizes. The guide roll also has an opposing crowder roll that maintains a force against the guide roll while also being active so as to move in and out to conform to the rough side of the cant.

The steering mechanism and the chipper drum are active as the cant proceeds through the saws and are controlled by controllers that use control information from the optimized curve decision, thus controlling the movements of the cant as it proceeds through the apparatus, profiling one face of the cant and cutting the cant into boards as defined in the cutting description.

An alternate embodiment consists of two opposed chipper heads. In this embodiment a cant may be chipped from both sides, with the steering being done from one side or the other, depending on the cant being sawn. Air bags are provided on all steering rolls. The air bags may be locked so as to become solid when being used for steering, and may be unlocked to act as a crowding roll when the opposite side is doing the steering.

Alternatively, a plurality of overhead press rolls, and underside fixed rolls hold the cant from the top and bottom by pressing down onto the flat surface of the cant thus pressing the cant between the lower rolls and the overhead press rolls. The cant is fed straight into the gang saw and the gangsaw translated and skewed so as to follow the optimized curve sawing solution.

In summary, in a second mechanical embodiment of the present invention, a cant, having been scanned by a scanner, is transferred onto a positioning means such as a positioning roll case where the positioning means includes means for selectively skewed pre-positioning of a cant upstream of a selectively and actively positionable cant reducing means such as a chipper head for forming either a curved third face or curved third and fourth faces on the cant. The device further includes an upstream pair of opposed selectively actively positionable cant guides and a downstream pair of opposed selectively actively positionable cant guides, the upstream pair of guides being downstream of the cant reducing means and the downstream pair of guides being upstream of gang saws mounted on a saw arbor. The upstream and downstream pair of guides are aligned, with one guide of each pair of guides generally corresponding with the cant reducing means on a first side of the cant transfer path. The opposed guides in the two pairs of guides are in opposed relation on the opposing side of the cant transfer path and are generally aligned with a cant positioning means along the cant transfer path. The cant positioning means is in opposed relation to the cant reducing means, that is, laterally across the cant transfer path.

In addition, either in combination with the above or independently, the gang saws and saw arbor may be selectively actively positionable both laterally across the cant transfer path and rotationally about an axis of rotation perpendicular to the cant transfer path so as to orient the gang saws to form the curved face on the rough face of the cant and to form a corresponding array of parallel cuts by the gang saws corresponding thereto.

In a further aspect, the selectively actively positionable cant reducing means is an opposed pair of selectively actively positionable cant reducing means such as an opposed pair of chipper heads placed in spaced apart relation on either side laterally across the cant transfer path.

In a further aspect, the pairs of selectively actively positionable cant guides includes actively positionable cant guides on the side of the cant corresponding to the actively positionable cant reducing means and on the opposing side laterally across the cant transfer path, the cant guides on the side of the cant transfer path corresponding to the cant positioning means or, in the embodiment having opposed pairs of selectively actively positionable cant reducing means, the side of the cant transfer path corresponding to the cant reducing means which is selectively deactivated so as to become a passive guide.

Summary of the Third Mechanical Embodiment

The third mechanical embodiment consists of, first, an indexing transfer which temporarily holds a cant in a stationary position by a row of retractable duckers or pin stops, for regulated release onto a sequencing transfer. The sequencing transfer feeds the cant through a scanner, where the scanner reads the profile of the cant and sends the data to an optimizer.

An optimizing algorithm in the optimizer generates three dimensional models from the cant's measurements, calculates a complex "best" curve related to the intricate contours of the cant, and selects a breakdown solution including skew angles and a cut description by position cams that represents the highest value combination of products which can be produced from the cant. Data is then transmitted to a PLC that in turn sends motion control information related to the optimum breakdown solution to various machine centers to control the movement of the cant and the cutting of both a profiled cant and the designated gangsaw products.

Immediately following the scanner is a sequencing transfer which feeds a profiler positioning table and subsequently a profiler. The sequencing transfer includes a plurality of rows of retractable duckers or pin stops perpendicular to the flow that hold the cant temporarily for timed release so as to queue the cant for delivery onto the profiler positioning table.

The profiler positioning table locates and skews the cant to a calculated angle for proper orientation to the profiler and then feeds the cant linearly into the profiler whereby it removes the vertical side face(s). The newly profiled face or faces, used to steer the cant through the gang saws, follow the optimum curve calculated by the computer algorithm from the scanned image of the individual cant. The removal of superfluous wood from the vertical face(s) is achieved by the interdependent horizontal tandem movement of opposing chipping heads or bandsaws, substantially perpendicular to the direction of flow.

On the outfeed of the profiler an outfeed rollcase has a jump chain that raises the cant off the rolls and then feeds the cant onto a cant turner were the cant is turned over laterally 180 degrees if necessary to the proper orientation for entry into the curve sawing gang. The jump chain includes a plurality of rows of retractable duckers or pin stops that hold the cant temporarily for timed release to the cant turner.

A sequencing transfer, that also includes a plurality of rows of retractable duckers or pin stops, hold the cant temporarily for timed release so as to queue up the cant for release onto a positioning rollcase. The positioning rollcase includes a skew bar with retractable pins that pre-positions the profiled cant on the correct angle and in front of the selected gangsaw combination that has been determined by the optimizer to provide the optimum breakdown solution. The skew angle is calculated by the optimizer algorithm to present the profiled cant tangentially to the saws. The skew bar pins retract, the rollcase feeds the profiled cant into a steering mechanism, and the steering mechanism, using control information from the optimized curve decision, then controls the movement of the cant as it proceeds through the array of saws, cutting the profiled cant into the boards defined in its cutting description.

In summary, the curve sawing device of a third mechanical embodiment of the present invention comprises a cant profiling means for opening at least a third longitudinal face on a cant, wherein the third face is generally perpendicular to first and second opposed generally parallel and planar faces of the cant, according to an optimized profile solution so as to form an optimized profile along the third face, cant transfer means for transferring the cant from the cant profiling means to a cant skewing and pre-positioning means for selectively and actively controllable positioning of the cant for selectively aligned feeding of the cant longitudinally into cant guiding means for selectively actively laterally guiding and longitudinally feeding the cant as the cant is translated between the cant skewing and pre-positioning means and a lateral array of generally vertically aligned spaced apart saws so as to position the third face of the cant for guiding engagement with cant positioning means, within the cant guiding means, for selectively actively applying lateral positioning force to the third face to selectively actively position the cant within the cant guiding means as the cant is fed longitudinally into the lateral array of generally vertically aligned spaced apart saws.

The curve sawing method of the third mechanical embodiment of the present invention comprises the steps of:

a) profiling a cant by a cant profiling means to open at least a third longitudinal face on a cant wherein the third face is generally perpendicular to the first and second opposed generally parallel and planar faces of the cant, the profiling according to an optimized profile solution generated for the cant so as to form an optimized profile along the third face, b) transferring the cant by cant transfer means from the cant profiling means to a cant skewing and prepositioning means, c) skewing and prepositioning the cant by the cant skewing and prepositioning means to selectively and actively controllably position the cant for selectively aligned feeding of the cant longitudinally into cant guiding means, d) guiding the cant by the cant guiding means for selectively actively laterally guiding and longitudinally feeding the cant as the cant is translated between the cant skewing prepositioning means and a lateral array of generally vertically aligned spaced apart saws, e) positioning the third face of the cant by cant positioning means within the cant guiding means so as to position the third face of the cant for guiding engagement with the cant positioning means, the cant positioning means for selectively actively applying lateral positioning force to the third face to selectively actively position the cant within the cant guiding means as the cant is fed longitudinally into the lateral array of generally vertically aligned spaced apart saws, f) feeding the cant longitudinally from the cant guiding means into the lateral array of generally vertically aligned spaced apart saws.

In both the curve sawing device and the curve sawing method of the present invention the cant profiling means may open a third and fourth longitudinal face on the cant wherein the third and fourth faces are generally perpendicular to the first and second opposed generally parallel planar faces of the cant and are themselves generally opposed faces, and wherein within the cant guiding means the cant positioning means comprise laterally opposed first and second positioning force means corresponding to the third and fourth faces respectively to, respectively, actively applied lateral positioning force to selectively actively position the cant within the cant guiding means.

In further aspects of the present invention, the first and second laterally opposed positioning force means each comprise a longitudinally spaced apart plurality of positioning force means. The first positioning force means may include, when in guiding engagement with the third face, longitudinal driving means for urging the cant longitudinally within the cant guiding means.

BRIEF DESCRIPTION OF THE DRAWINGS

The invention will be better understood by reference to drawings, wherein.

DETAILED DESCRIPTION OF PREFERRED EMBODIMENTS

Figure 1:
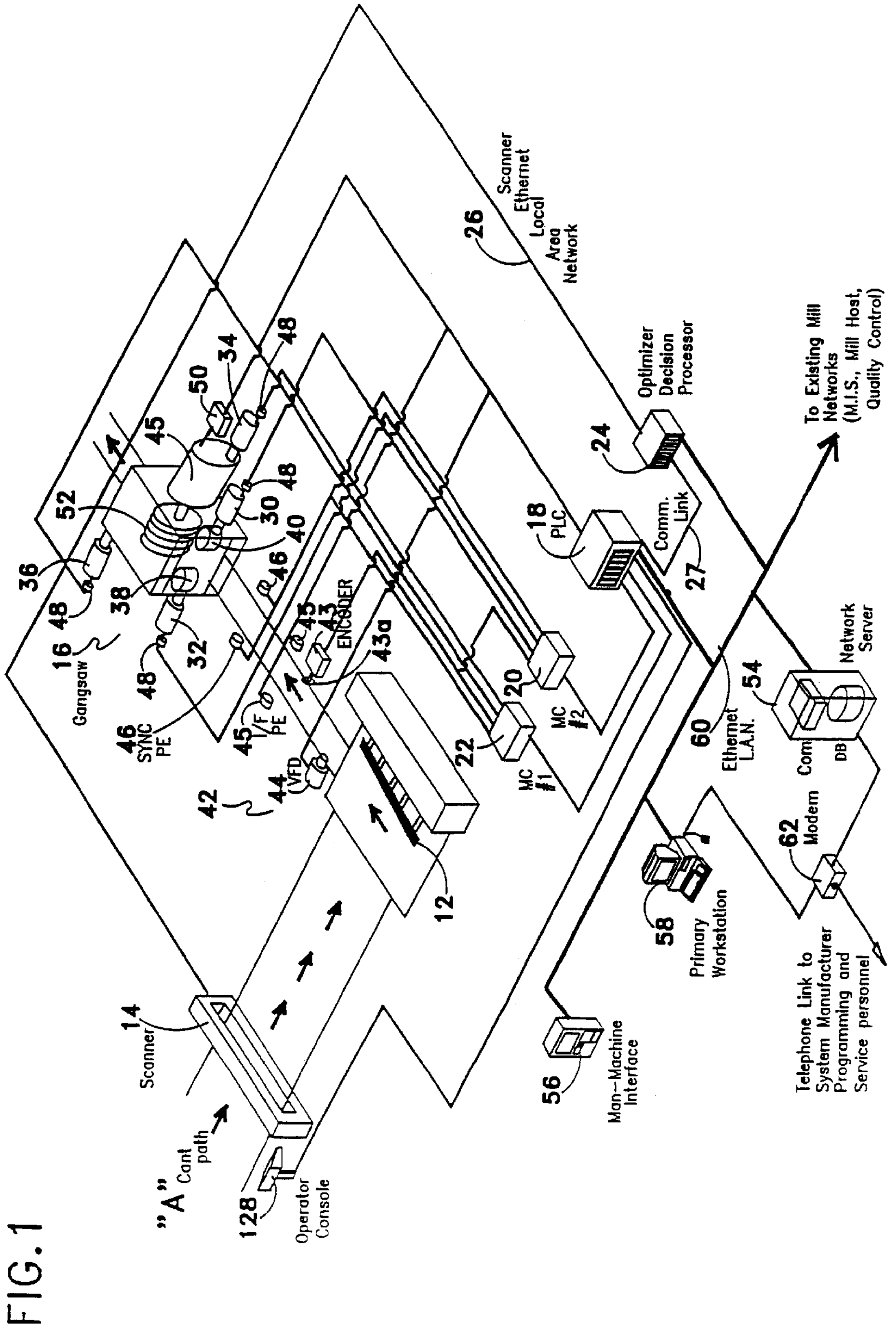
FIG. 1 is, in perspective view, a schematic representation of a typical integrated motion controlled curve sawing system of the present invention.
Figure 1A:
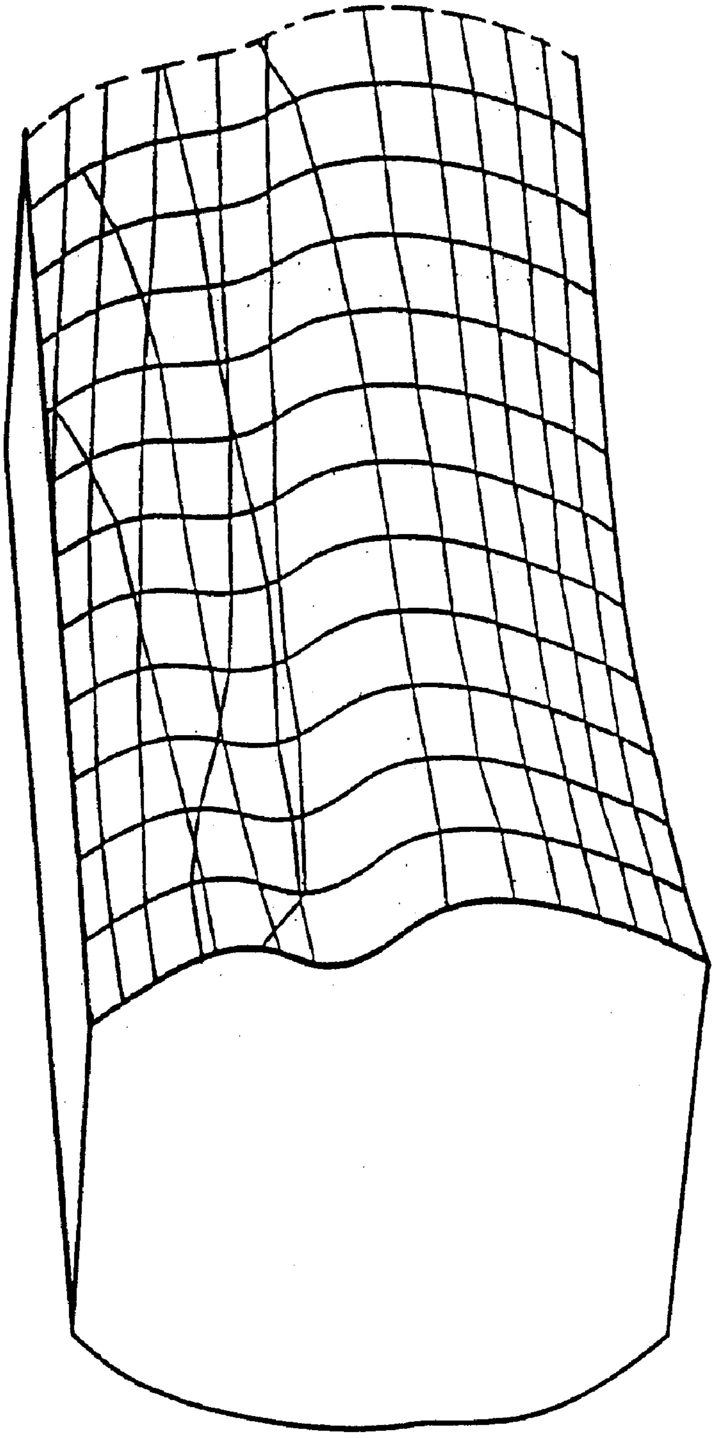
FIG. 1*a* is, in perspective view, a scanned profile of a cant segment.

FIG. 1 illustrates, schematically, a typical arrangement of the various machine centers and devices which are coordinated in the embodiments of the present invention to optimize the curve sawing of workpieces, such as cants, arriving in a mill flow direction A. Workpieces 12 are transferred through a non-contact scanner 14 for feeding thereafter through chipping heads and active saws. The position-based approach of the present invention relies on the scanner 14 first taking discrete laser, or other non-contact scanner measurement readings of a workpiece passing through the scanner so as to provide the measurement data from which the workpiece is mathematically modelled so that, if printed, might be depicted by way of example in FIG. 1*a*. The scanner 14 is used to map the workpiece 12 passing therethrough so as to generate a profile of the workpiece along the length of the workpiece.

The mathematical model of the workpiece 12 is processed in its entirety, or sufficiently much is processed so that the model may be optimized to produce a cutting solution unique for that workpiece. Optimizing generates a mathematical model of the entire cant and an optimized cutting solution. Position-cam data is then generated for the motion controllers.

A position cam is the set of position data for the cutting devices at each of a longitudinal array of increments along the length of the workpiece profile. The position cams corresponding to the array of increments define, collectively, a table of position data or array of position data points for each linear positioner axis of the active cutting devices. In one sense the position cams may be thought of as virtual position location targets to which the cutting devices will be actively maneuvered to attain along the length of the workpiece, keeping in mind that the active cutting devices, such as an active sawbox 16, may weight in the order of 40,000 pounds.

Figure 2:
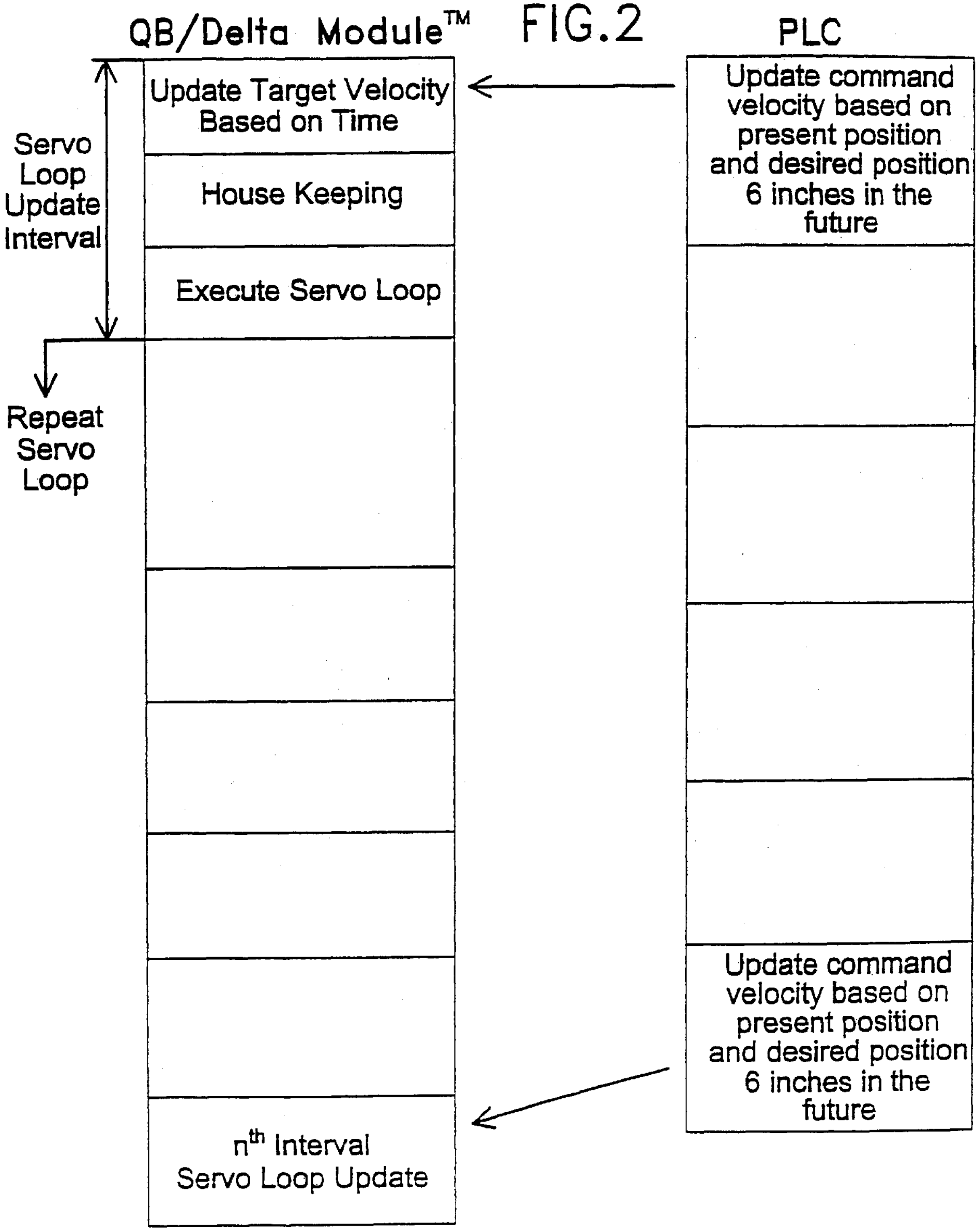
FIG. 2 is a flow chart of a prior art time-based curve sawing method.

The position based method of the present invention provides advantages, as hereinafter described, over the inferior method of merely providing sequential, that is, time based point-to-point data so as to provide sequential curve sawing instructions for moving the saws dependent on constant feed speed, illustrated in the form of a flow chart in FIG. 2. A position based method rather than the point-to-point cutting method is preferred so that the orchestration and coordination of the various machine centers and devices is not reliant on, for example, a constant feed speed to provide X-axis data such as is the case in point-to-point time based motion instructions to the gangsaws where, if X-axis translation speed, i.e. feed speed, is varied, then the optimized cutting solution is spoiled because the location of the workpiece is no longer synchronized with the position of the saws.

Figure 3:
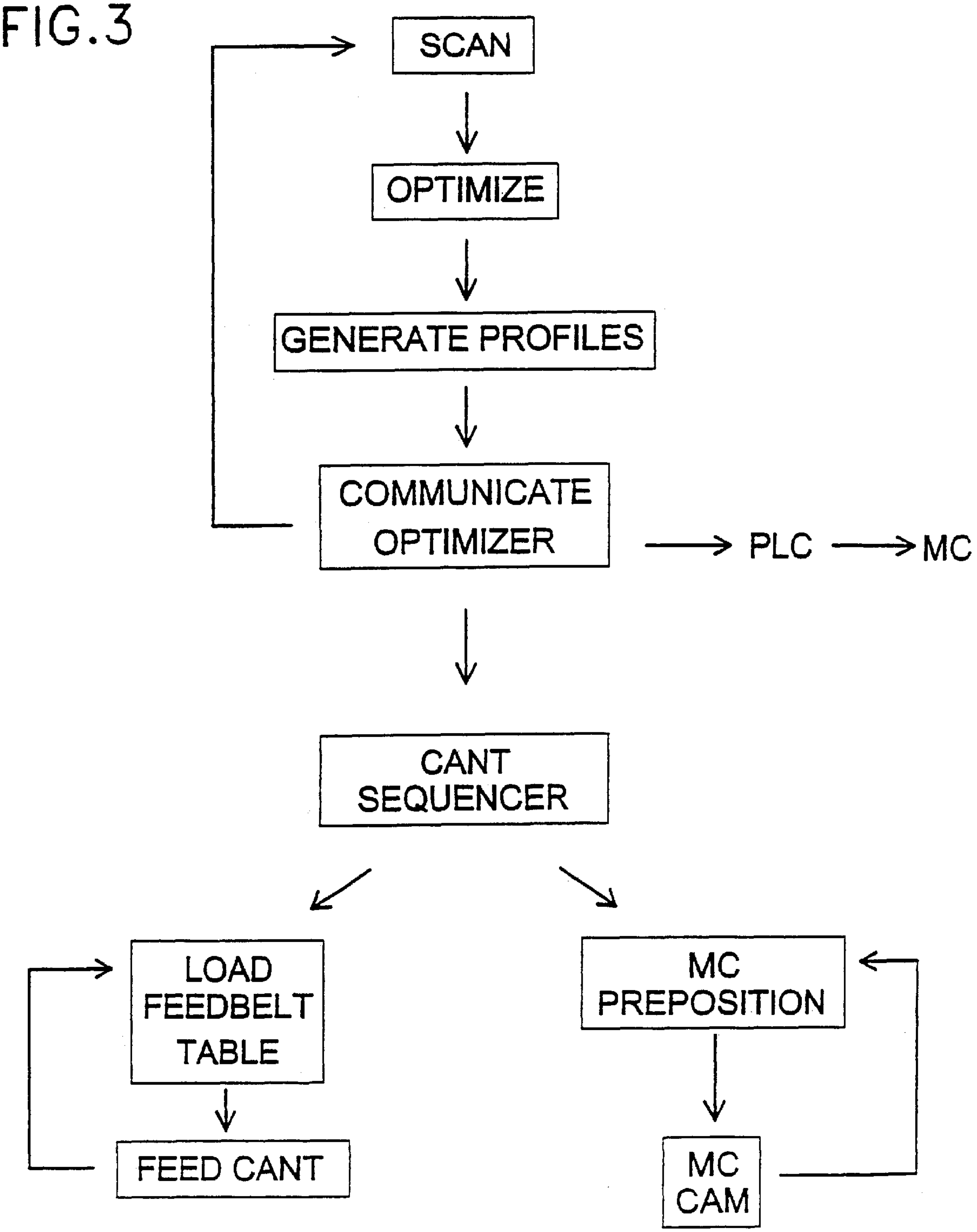
FIG. 3 is a schematic block diagram representation of the integrated motion controlled curve sawing functions of the present invention.
Figure 4A:
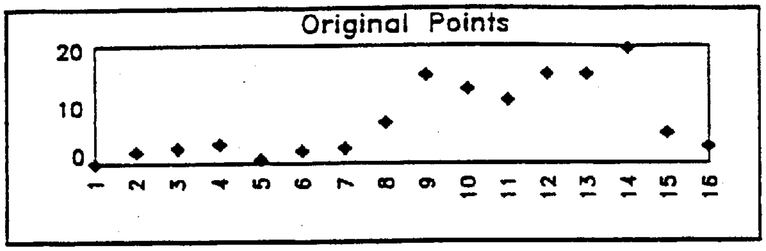
FIG. 4 are, sequentially depicted in FIGS. 4*a*–4*e*, representations illustrating the optimizer method of the integrated motion controlled curve sawing of the present invention.
Figure 4B:
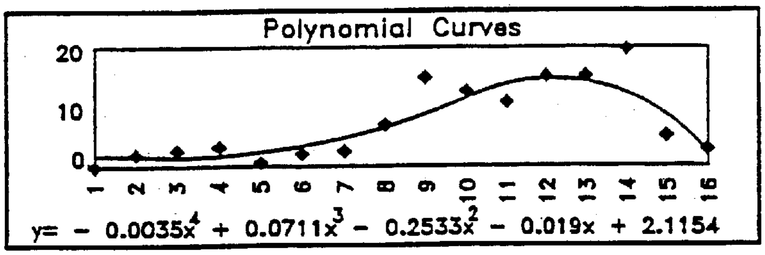
Figure 4C:
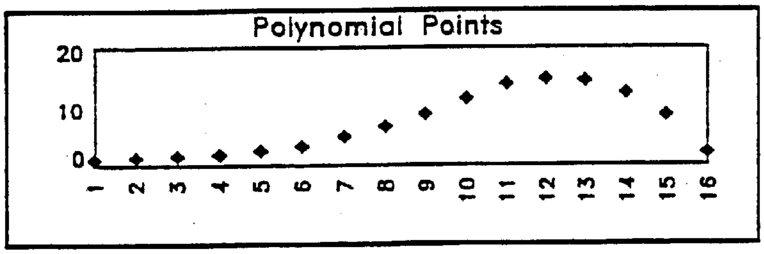
Figure 4D:
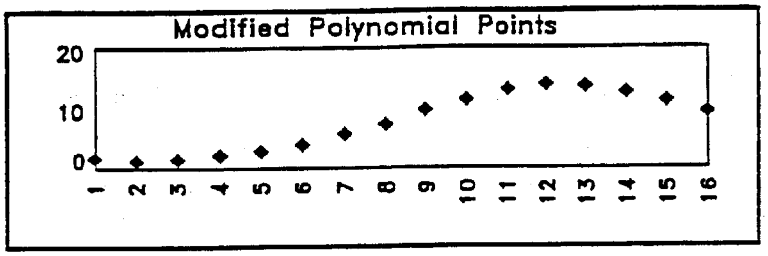
Figure 4E:
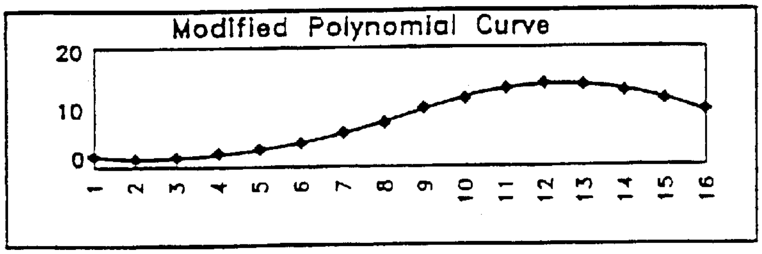

Orchestration of the machine centers and devices to take advantage of the position based method of the present invention is accomplished by a programmable logic controller (PLC) 18 and two motion controllers (MCs) 20 and 22. In overview, schematically illustrated in the flow chart of FIG. 3, scanner 14 samples the workpiece 12 profile and provides the raw profile measurement information to a processor 24 known as an optimizer on local area network (LAN) 26. The optimizer employs an optimizing algorithm to smooth the data and generate a mathematical model of the workpiece according to the procedure set out in Schedule A hereto and described below. The process of data smoothing and generation of a curve is depicted schematically in FIGS. 4*a*–4*e*. The result is an optimized cutting solution decision by the optimizer 24 which is then communicated or handed off to the PLC 18 on communication link 27 and to the motion controllers 20 and 22. The PLC may be an Allen-Bradley™ 5/40E PLC, and the two motion controllers may be Allen-Bradley™ IMC S-Class motion controllers.

In one embodiment of first present invention, the PLC 18 directly controls all of the devices, with the exception that the two motion controllers 20 and 22 control four linear positioners 30, 32, 34 and 36. The PLC buffers operator inputs for each workpiece and delivers these inputs to the scanner just prior to scanning. Optimizer decisions are sent from the optimizer to the PLC. The PLC uses the optimizer decision information to process the workpiece through the machine centers and devices. The PLC also buffers information exchange between the optimizer and the motion controllers.

Of the two motion controllers, one motion controller 20 controls the linear positioners 30 and 32 used to move chipping heads 38 and 40, and the other motion controller 22 controls the steering rolls in a gangsaw downstream of the chipping heads or the orientation of the sawbox in an active gangsaw 16 by positioners 34 and 36. Given sufficient processing power, the two motion controllers may be combined into a single motion controller. The motion controllers operate on position cam data and sawbox set calculations as hereinafter described. The position cams use "X" and "Y", or, alternatively, "master" and "servant" axes respectively to move the chipping heads and the saws as the workpiece passes through. Position cams operate on the principle that, for every point along the X axis (feed direction), there is a corresponding point, whether real or interpolated, on the Y axis. The X axis position is provided by the mill flow infeed devices such as transfer chains, sharp chains, belts, rolls, or the like generically referred to as feedworks 42. The Y axis position is the target tool or cutting path for the chipping heads and saws. The target cutting or tool path may be made up of data points every 6 inches along the length of the workpiece 12.

The motion controllers are connected to the PLC as part of the remote input/output (I/O) system remotely controlling the machine centers and devices. The PLC communicates position cam data from the optimizer to the appropriate motion controller.

The workpiece and the corresponding optimizer decision have to be sequenced and matched. Consequently, as the method of the present invention is position based, the position of the workpiece relative to the machine centers and devices has to be known. One method, and that employed in the present embodiments, is the use of an encoder 43 which, by means of a coupler 43*a*, tracks the translation of a feed conveyor on feedworks 42. Thus the longitudinal position of the workpiece 12 is tracked by the encoder 43.

The workpiece is fed longitudinally on the feedworks with its orientation maintained such as by press rolls while it is translated towards and through the sawbox. An infeed photoeye (I/F PE) 45 may be used to sense location of a workpiece 12 on the feedwork 42 to time raising and lowering of the press rolls into engagement with the workpiece so as to hold the workpiece against the feed conveyor to prevent lateral movement of the workpiece relative to the conveyor. The cutting machine centers, which may include, bandsaws, sash gangs, or the like, or chipping heads 38 and 40 and/or circular saws 52, are actively preset to their starting positions to process the workpiece. The gap between subsequent workpieces may be adjusted if required, as is feed speed as hereinafter better described. Synchronization of the workpiece with the position cam data is facilitated by a synchronizer photoeye (SYNC PE) 46 which detects the longitudinal ends of the workpiece as it is being translated on the feedworks 42 in the mill flow direction. The workpiece is synchronized so that the position cam position targets for the cutting devices correspond to their intended locations on the workpiece. Cutting device motion is started prior to engaging a cutting device. The workpiece first enters the chipping heads, the position and motion of the chipping heads having been initiated and prelocated to encounter the anticipated position of the workpiece. The chipping head position feedback is read in a time-based servo loop and the motion velocity of the chipping head adjusted to correct the position of the chipping head to follow the position cams corresponding to the workpiece, so as to put the chipping heads on track with, or to as best as possible move the chipping heads towards coinciding with, the position cam position targets or tool path on the workpiece.

In one embodiment, the position of the gangsaw is actively preset and the gangsaw motion initiated as the workpiece approaches the saws. The gangsaw position feedback is read in a time-based servo loop and the gangsaw motion velocity is adjusted to again correct the position of the gangsaw to follow the position cam data.

The workpiece feed speed may be adjusted in response to anticipated loading or instantaneous loading of the cutting devices, whether chipping heads or gangsaw circular sawblades. The workpiece feed speed may be varied by a variable frequency drive (VFD) 44 according to instructions from the PLC 18. Feed speed may be reduced in the event of binding of the workpiece or high motor loadings of the cutting devices. In an alternative embodiment, the feed may be reduced or reversed, in response to binding or high motor loadings of the cutting devices. In the case of chipping heads, the chipping heads may be disengaged or relieved if their corresponding motor loading becomes high. In one embodiment the RPM of the chipping heads and sawblades is maintained constant. Advantageously, to equal lateral cutting forces of the chipping heads, the bus load, that is, amperage to the chipping head motors, may be differentially varied. In an alternative embodiment, to avoid chip fines, the RPM may be adjusted to maintain chip quality, for example, reduced if chip fines are being produced. RPM may be adjusted also to compensate for the volume of material being removed from the cant, the density of the material, and any density varying anomalies such as burls, or knots, or the like.

Figure 5A:
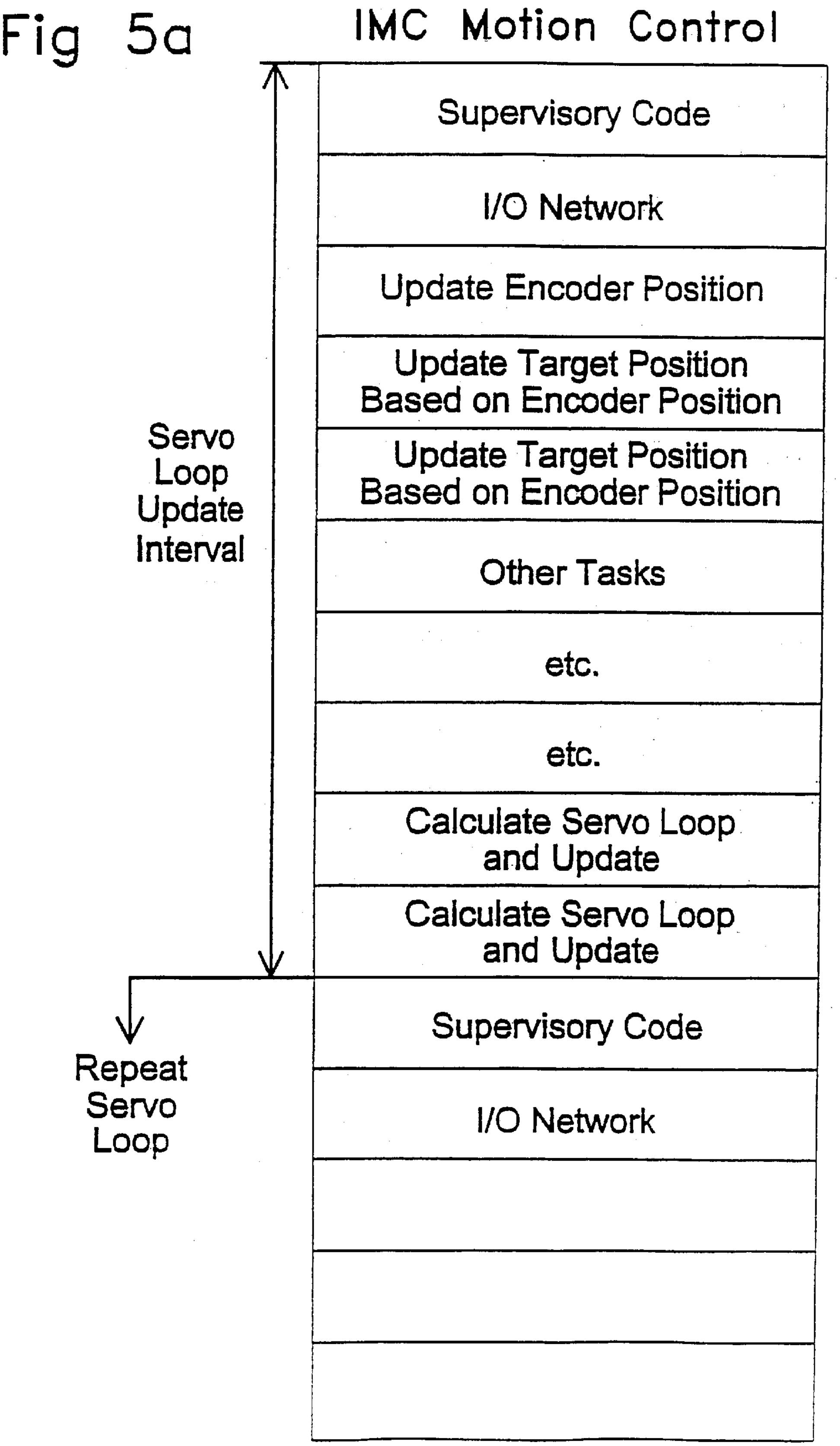
FIG. 5*a* is a flow chart of the servo loop updates of the position-based curve sawing of the present invention.

Position feedback to the motion controllers is provided by Temposonic™ actuator position sensors 48. Advantageously, time-based feedback is provided to the motion controllers every 60/1000 inch (approximately 1/16 inch) of feed travel at 300 feet per minute, that is, approximately every one milli-second, as seen in the flow chart in FIG. 5*a*, where the supervisory code initiates the sequence for every servo loop update.

The workpiece feed speed may be matched to the material density, as determined, for example, by an x-ray lumber gauge, and/or to the saw design and cutting device loading, blade sharpness, etc. The workpiece feed speed may be adjusted to compensate for material volume to be removed, material density and workpiece anomalies such as burls, knots or the like. Feed speed and RPM of the chipping heads may be adjusted to mutually compensate. The feed speed may be present for the anticipated loading or adjusted to compensate for monitored load levels on the cutting device motors 45 (for example by monitoring amperage). The use of position cam data allows for corresponding coordination of active cutting devices to keep a correspondence between the desired cutting solution along the positions cams or tool paths with the actual position of the workpiece.

The workpiece feed speed is varied as part of the orchestration of the machine centers and devices to maximize performance of the overall system. Variation of feed speed so as to maximize the feed sped assists in providing enhanced throughput in terms of lumber volume. In particular, feed speed maximization allows the machine centers to operate at their limitations for the length of the workpiece, and reduces stalling and slipping of the workpiece, resulting in cutting off the desired tool path, when held down onto the feedworks 42 by, for example, press rolls. As a result, wear on chipping heads and saw arbor assemblies may be reduced. The frequency of saw arbor motor overload conditions or chipping head motor overload conditions may be reduced. Further, as mentioned above, active and dynamic control of the feed speed may compensate for changes in sharpness in saw blades or chipping knives or for variations in wood density from an average value used in the optimizer for its volume calculations.

The average wood density used by the optimizer is used to calculate the approximate horse power required to remove the wood necessary to generate or attain the cutting decision. The optimizer compares the required horse power to the horse power limitations of the cutting devices. This comparison is used to derive an optimized feed speed profile at approximately two foot increments along the workpiece.

The PLC logic code uses the optimizer profile as a set point. Actual motor current is monitored by sensor 50 to provide feedback to the PLC 18. The set point and feedback signals are used to create a speed reference for the variable frequency drive 44 using a proportional internal derivative (PID)-like algorithm. The current feedback signals are only valid and relied upon when the workpiece 12 is mechanically engaged by the cutting devices such as the chipping heads 38 and 40 or saws 52.

As seen in FIG. 1, optimizer 24 and associated network server 54, man-machine interface 56, PLC 18 and primary work station 58 communicate across a common Ethernet™ LAN 60, which is available as a connection point to existing mill networks. This connection point allows workstations within the existing mill offices (with appropriate software) access to all cant optimization functions. A dedicated communications link 72 may exist between optimizer 32 and PLC 18. All workstations and the network server 54 use applications which provide mill personnel the tools they require to define their environment, such as scanner, optimizer, machine centers, products, and shift schedules reports relative to the cant optimizer system; pre-generate various start-up configurations; start, stop and load the system; visually monitor the cant as it proceeds through the machine centers; and monitor the operation for unusual conditions.

A modem 62 attached to the network server 54, and the primary workstation 58 using remote access software and appropriate controls, allows remote dial-up access to the mill site for software reprogramming and remote operation of almost every application and function as well as retrieval of statistics and cant summaries for off-site service analysis. The man-machine interface 56 provides operator input and allows the operator access to various levels of machine operation and control. The PLC 18 and motion controllers 20 and 22, share the task of monitoring speed and position of the cant and controlling positioners.

The above position-based integrated motion control method for curve sawing is employed in the coordination of the three mechanical embodiments of the chipping heads and saws as set out below.

In embodiments of the present invention where an opposed pair of chipping heads are mounted to an articulatable sawbox containing a saw cluster on a saw arbor, so that translating and skewing the sawbox also correspondingly translates and skews, about a common axis of rotation, the chipping heads, a geometric problem is encountered due to the instantaneous chipping location of the chipping heads being spaced apart, for example in front of, the instantaneous cutting location of the laterally outermost saw on the saw arbor. If it is desired to accurately cut a so-called jacket board, that is, a side board, from the cant material between the outermost saw and the corresponding chipping head, the spacing between, and the locations of, the instantaneous cutting locations must be known and accounted for.

An inferior method entails linear approximation methods. However, cutting accuracy, where skewing approaches the order of six degrees, suffers where linear approximations are used. A better method, and that employed in the curve sawing of the present invention, requires use of non-linear equations of motion, referred to as sawbox set calculations, for both the chipping heads and for the saws.

Figure 5B:
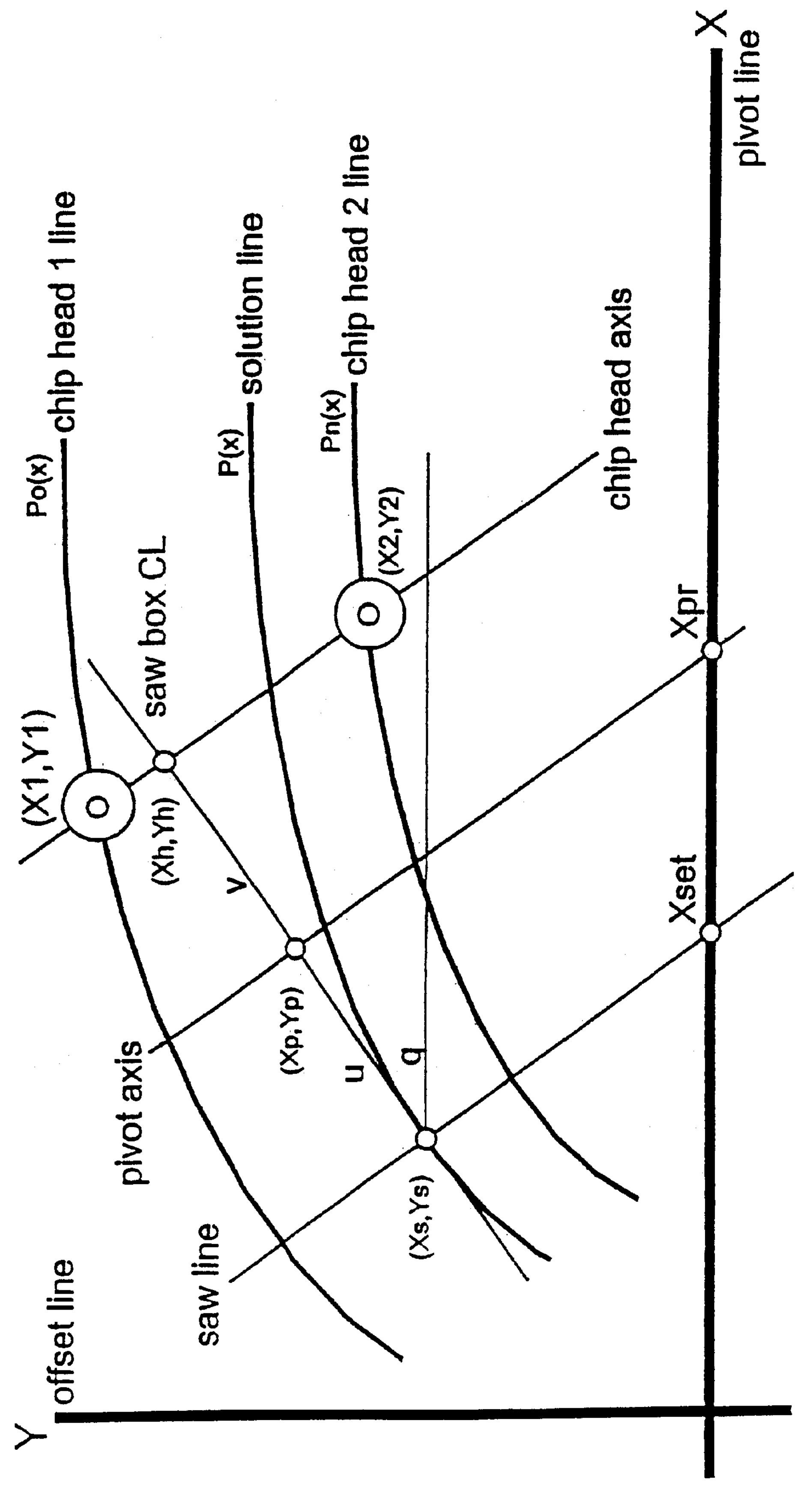
FIG. 5*b* is a graphic representation of the sawbox set calculations of the curve sawing method of the present invention.

Saw box set calculations are graphically depicted in FIG. 5*b*, where a chipping line is seen spaced apart from the sawline (the solution line). A jacket board is manufactured between the saw line and the chipping line. It is desirable to have an accuracy in the order of 5–10 thousand's of an inch in sawing variations in the thickness dimension. To achieve that accuracy an equation of motion for both the rotation and translation of the sawbox arbor and, independent of that, the chip head equation of motion is required. This is because the sawbox is on a base that translates, and, overlaid, is a skewing, that is, rotating, member whose axis of rotation, that is, the pivot point for the skewing, is not in alignment with the instantaneous sawing point on the saws, as the pivot point for the skewing is generally in the center of the saw arbor. In addition, the chip heads are further displaced from the pivot point so, as the sawbox is skewed, the chip heads swing through an arc and so also the corresponding instantaneous saw center swings through an arc. These misalignments both affect the saw line and chipping line, the difference between the saw line and the chipping line being the thickness of the recovered jacket board.

In the inferior approximation method above noted, the assumption is made that the mis-alignments are all linear and that a ratio based on the radius or the lever arm between the chip head and the pivot point and between the instantaneous saw center and the pivot point is a sufficient approximation. In fact, as the skew angle approaches zero the approximation is a linear problem. However, if the skew angle approaches five or six degrees the approximation no longer is linear, that is, the small angle approximation no longer holds, and the actual geometry must be accommodated.

In interpreting FIG. 5*b*, the cant may be visualized as remaining fixed in space and the sawbox travelling relative to it. In FIG. 5*b*, the Y axis is the offset line, meaning that this is the distance from the pivot line. The pivot line, the X axis in FIG. 5*b*, is the path travelled by the sawbox pivot point, that is, the axis of rotation for skewing of the sawbox along the length of the cant. The position tracking is done along the pivot line. Because the chipping heads are mounted on the common sawbox assembly, the chipping head axes share a common travel path, that is, the chipping head axes are parallel to the saw arbor and at the same distance from it. The solution line is a smooth path defining the curve to be followed as the sawing line. It may be chosen to minimize the solution line distance from the pivot line. The chipping head lines on either side of the solution line outline the paths to be taken by the center of the chipping heads. They are related to the solution line but are not parallel. Note that the cuttings points of the chipping heads varies along the length of the head and is not dependent on the angle θ as defined in FIG. 5*b*. Angle θ is the required angle of the sawbox to keep the saws tangent to the solution line. The saw line is the line projecting along the cutting points of the saws. It's distance from the pivot point may be dependent on the cant thickness. It is not the position of the saw arbors. The chord u defines the distance in FIG. 5*b* from the saw line to the pivot point axis. The chord v defines the distance from the pivot point axis to the chipping head axis, that is, the centerline of the chipping heads.

In FIG. 5*b*, the point labelled as $X_1$, $Y_1$ is the desired cutting point of the saw at the sampling point $x_1$ along the pivot line. Thus, $y_s=p(x_s)$. The point labelled as $x_s$ is the x coordinate of the position cam data. It will fluctuate from the sampling point $x_s$ by a small amount that can be ignored if the solution line is kept close to and a small angular deviation from the pivot line. The point $X_{pr}$ defines the pivot point of the saw box at the sample point $x_1$. It is about this point that the saw box assembly rotates. The point $X_p$, $Y_p$ in FIG. 5*b* is the intersection point of the saw box center line and the pivot axis. The point $X_h$, $Y_h$ in FIG. 5*b* is the intersection of the saw box center line and the chipping head axis. The points in FIG. 5*b* labelled $X_1$, $Y_1$ and $X_2$, $Y_2$ are the required position of the center of the chipping heads for the sample point $x_s$. They are the intersection points between the chipping head lines and the chipping head axes.

First Mechanical Embodiment

Figure 6:
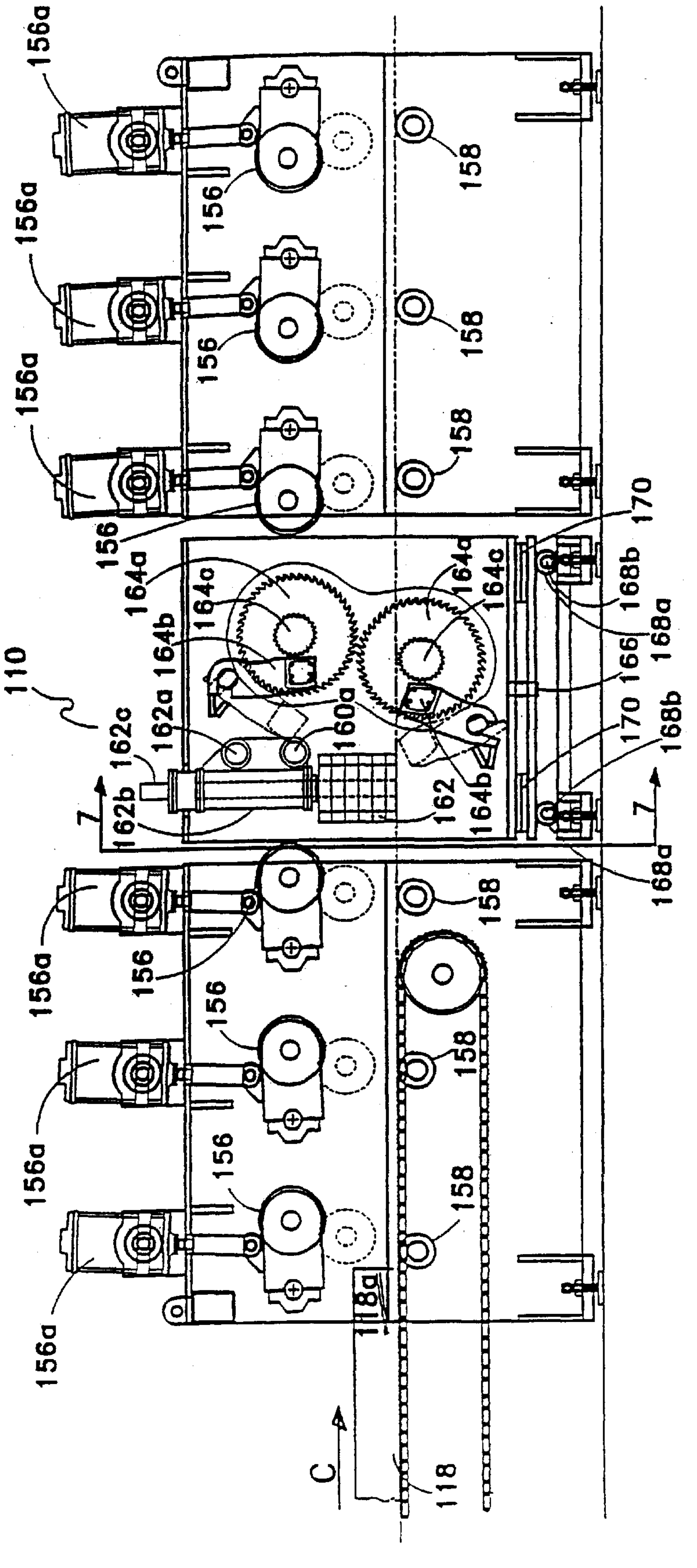
FIG. 6 is a side section view according to a preferred embodiment of the invention, taken along section line 6—6 in FIG. 8.
Figure 7:
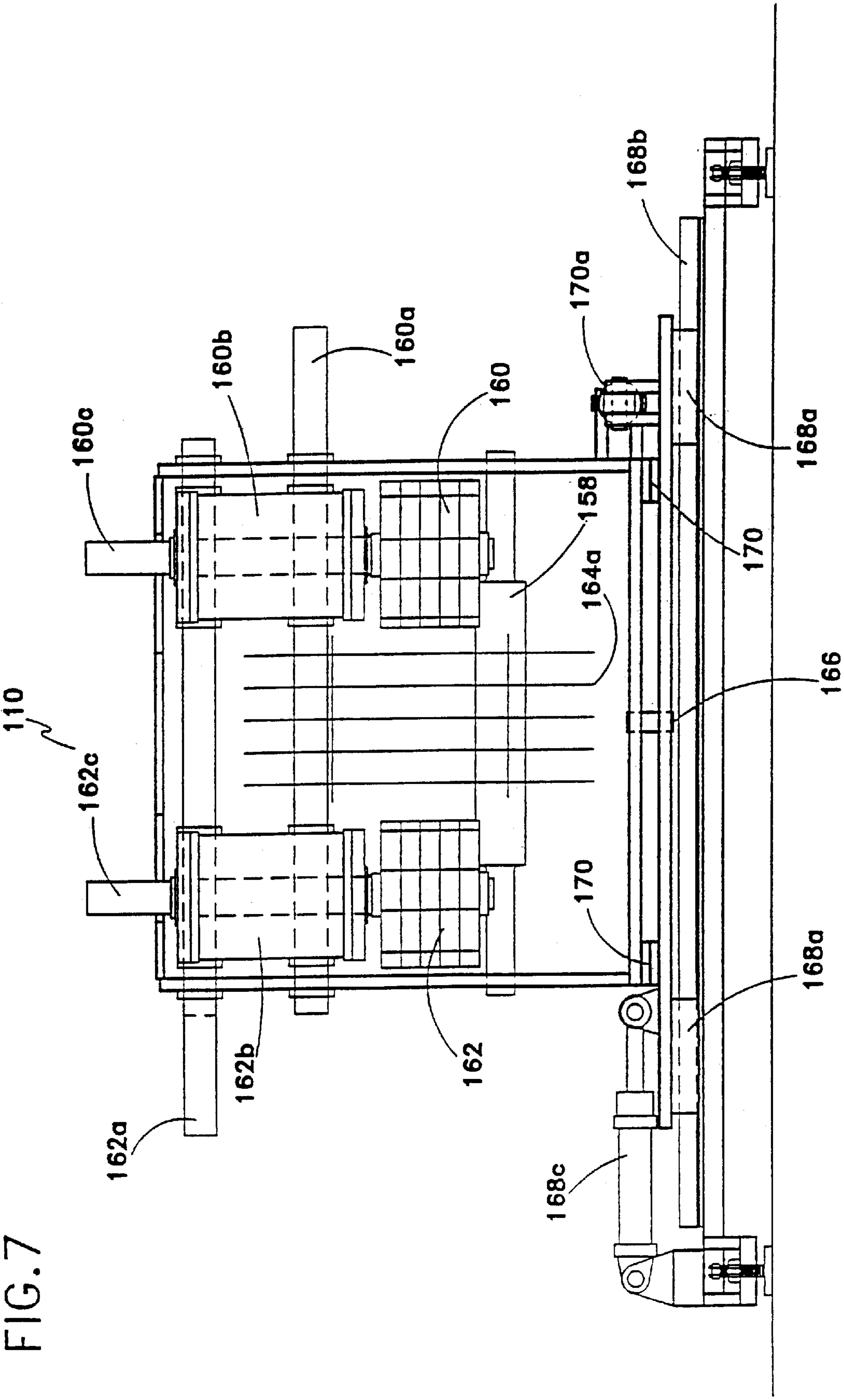
FIG. 7 is a end section view according to a preferred embodiment of the invention, taken along section line 7—7 in FIG. 6, with some parts not shown for clarity.

The gang saw apparatus of the first mechanical embodiment is generally indicated by the reference numeral 110 and is best seen in FIGS. 6 and 7.

Figure 8:
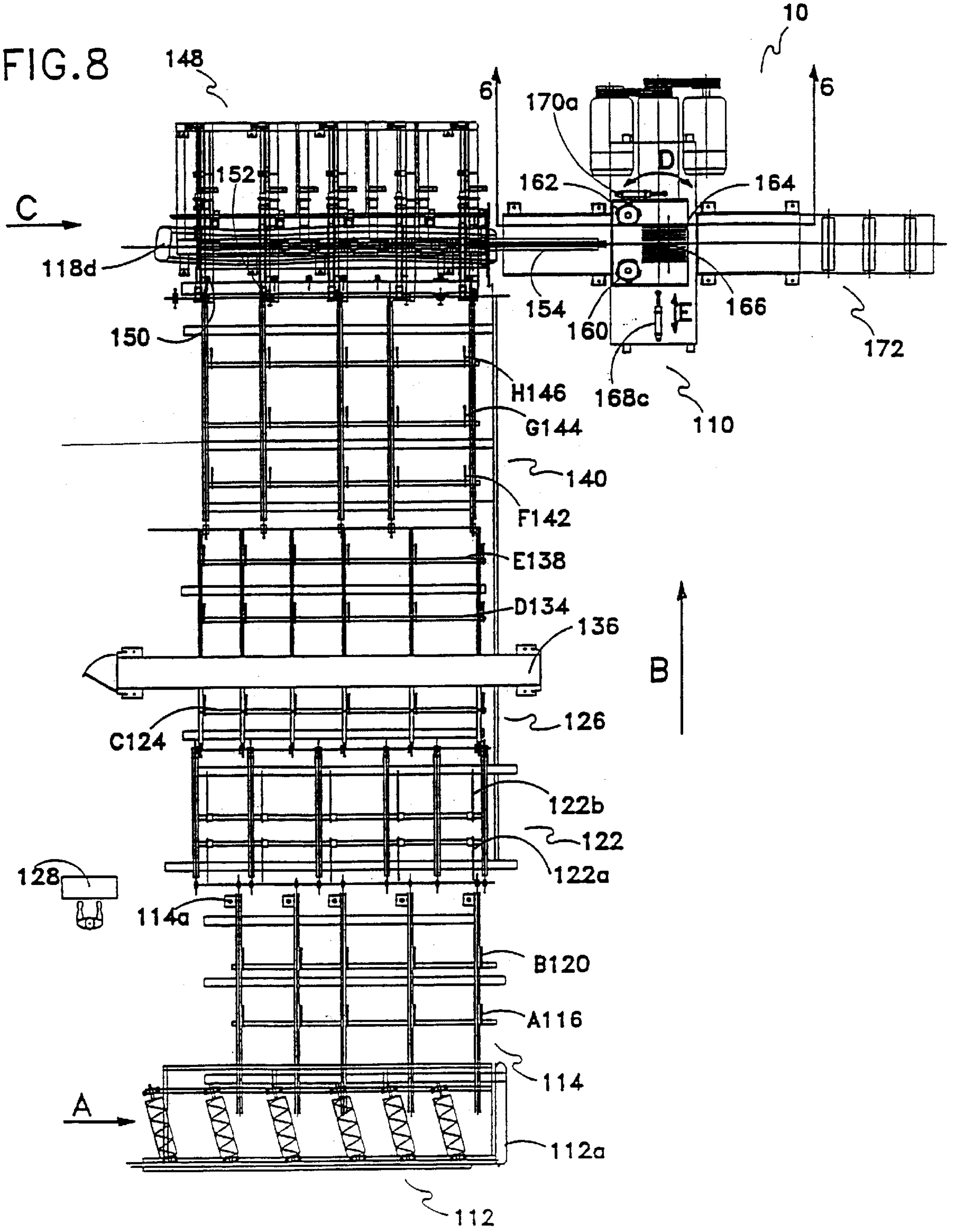
FIG. 8 is a plan view showing the curve sawing system.
Figure 9:
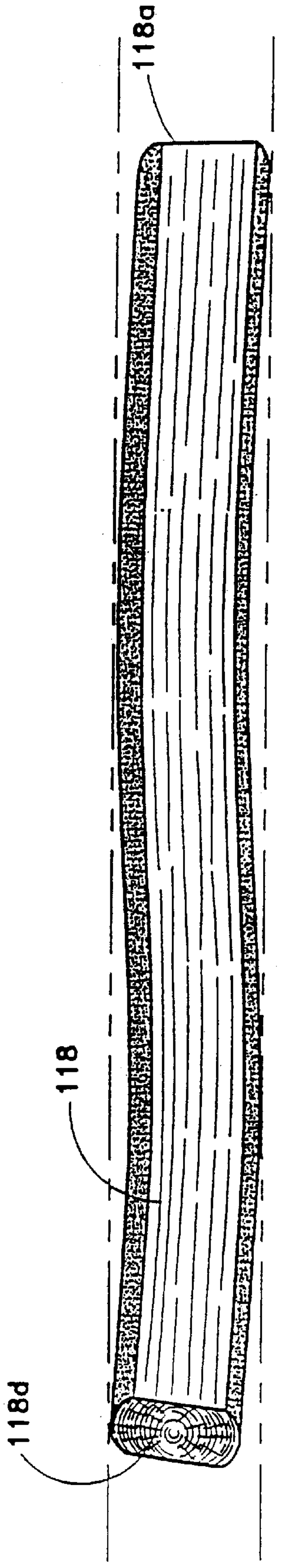
FIG. 9 is a perspective views of a two sided curved cant.
Figure 9A:
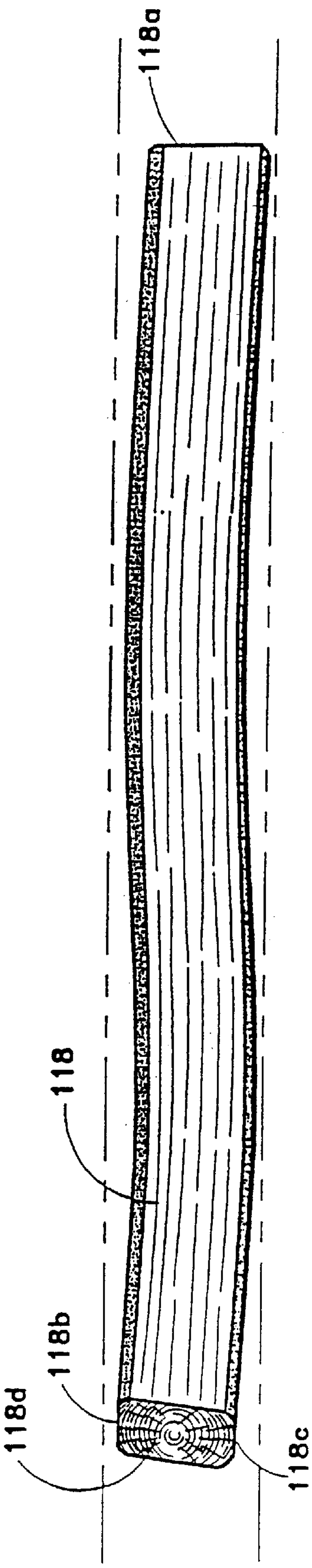
FIG. 9*a* is a perspective views of a four sided cant having been formed by the active chipping heads and sawn into boards by the active gangsaw.

As best seen in FIG. 8, an even ending roll case 112 with a live fence 112*a* receives the cant from the mill (direction A) and then transfers the cants to a cant indexing transfer 114 (direction B). Transfer 114 includes a ducker A116 which receives the first cant 118. When ducker B120 on the cant indexing transfer 114 becomes available the cant 118 is sequenced from ducker A116 to ducker B120.

Cant 118 advances from ducker B120 to pin stops 114*a* on cant indexing transfer 114 when pin stops 122*a* become available. Cant turner 122, not used with a dual chipper drum system, see FIG. 14, orients the cant for entering into gang saw 110. An operator may elect to turn the cant 118 with the cant turn 122 before advancing cant 118 to ducker C124 on the scanner transfer 126. Cant turner 122 includes cant turner arms 122*a* and 122*b*. If the cant 118 does not require turning then cant 118 will be sequenced from the ducker B120 to ducker C124, when ducker C124 becomes available. Ducker C124 is mounted on a scanner transfer 126. Operator entries are entered via an operator console 128 and communicated to PLC 18 and, in turn, to optimizer 24.

When ducker D134 on the scanner transfer 126 becomes available cant 118 is sequenced from ducker C124 to ducker D134. Scanner 136 scans cant 118 as it passes through the scanner. When ducker E138 on the scanner transfer 126 becomes available cant 118 is sequenced from ducker D134 to ducker E138. On cant sequencing transfer 140, cant 118 is sequenced to duckers F142, G144, and H146 as they become available.

In one alternative embodiment, although not necessary if the cant is scanned lineally, a positioning table is provided for positioning or centering, whether it be approximate positioning or accurate centering, of cant 118 on feedworks 42, which may be sharpchain 154. Positioning table 148 has park zone pins 150. When park zone pins 150 become available cant 118 is sequenced from ducker H146 to park zone pins 150 on the positioning table 148. When positioning table 148 becomes available park zone pins 150 lower and a plurality of table positioners 152 having positioners pins (not shown) move out over cant 118 and draw cant 118 back over to center of sharpchain 154 on positioning table 148 for feeding to gangsaw 110.

Figure 13:
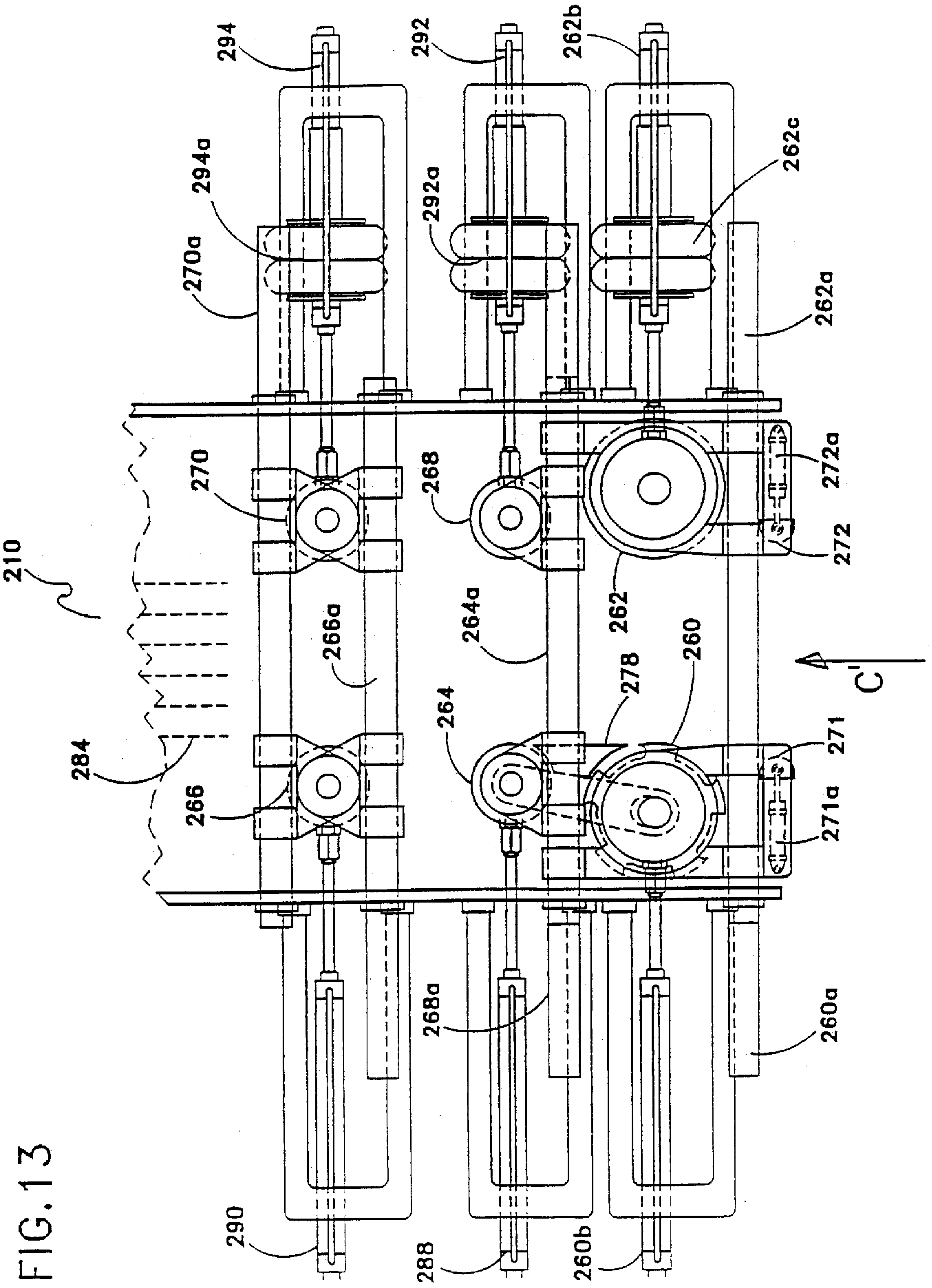
FIG. 13 is an enlarged, fragmentary plan view of a chipping drum and the steering and guide rollers.

As best seen in FIG. 6, a plurality of driven pressrolls 156, each having a corresponding pressroll cylinder 156*a*, press down to hold cant 118 against sharpchain 154 and bedrolls 158. Driven pressrolls 156 and sharpchain 154 drive cant 118 in direction C into the active gangsaw 110. As cant 118 enters the active gangsaw 110 active chipping heads 160 and 162 begin to chip two opposing vertical faces 118*b* and 118*c* on cant 118. Chipping heads 160 and 162 are positionable along guide shafts 160*a* and 162*a*. Drive shafts 160*c* and 162*c* are journalled in bearing mounts 160*b* and 162*b*. Chipping heads 160 and 162 are driven by motor means (not shown) and are selectively, slidingly positioned along guide shafts 160*a* and 162*a* by positioning means such as actuators known in the art (also not shown). Chipping heads 160 and 162 may have anvils (not shown) for diverting chips, the anvils such as shown in FIG. 13 as anvil 278.

The vertical faces 118*b* and 118*c* are created so vertical faces 118*b* and 118*c* align optimally with the saws 164*a* of the gangsaw saw cluster 164, whereby the saws 164*a* then begin to cut the cant 118, as cant 118 is fed in direction C. As best seen in FIGS. 7 and 8, the saw cluster 164 rotates about vertical axis along shaft 166 in direction D, and translates in direction E as cant 118 moves through gangsaw 110. Saws 164*a* within gangsaw saw cluster 164 are stabilized by saw guides 164*b*. Saw guides 164*b* contact both sides of saws 164*a* to provide stability to the saws 164*a* as cant 118 passes through gang saw cluster 164. Gangsaw saw cluster 164 are slidingly mounted on splined saw arbors 164*c*.

Gangsaw 110 translates in direction E, on guide bearings 168*a* along guides rails 168*b*, and gangsaw 110 skews in direction D along guides 170. Positioning cylinder 168*c* positions gangsaw 110 by selectively sliding gangsaw 110 on guide bearings 168*a* along guide rails 168*b* for translation in direction E. Positioning cylinder 170*a* selectively skews gangsaw 110 in direction D on guides 170.

Driven pressrolls 156 lift up as the trailing end 118*d* of the cant 118 passes in direction C onto outfeed roll case 164. The cant 118 (now boards) moves through and out of the gangsaw 110, and onto the gangsaw outfeed rollcase 172.

Second Mechanical Embodiment

Figure 10:
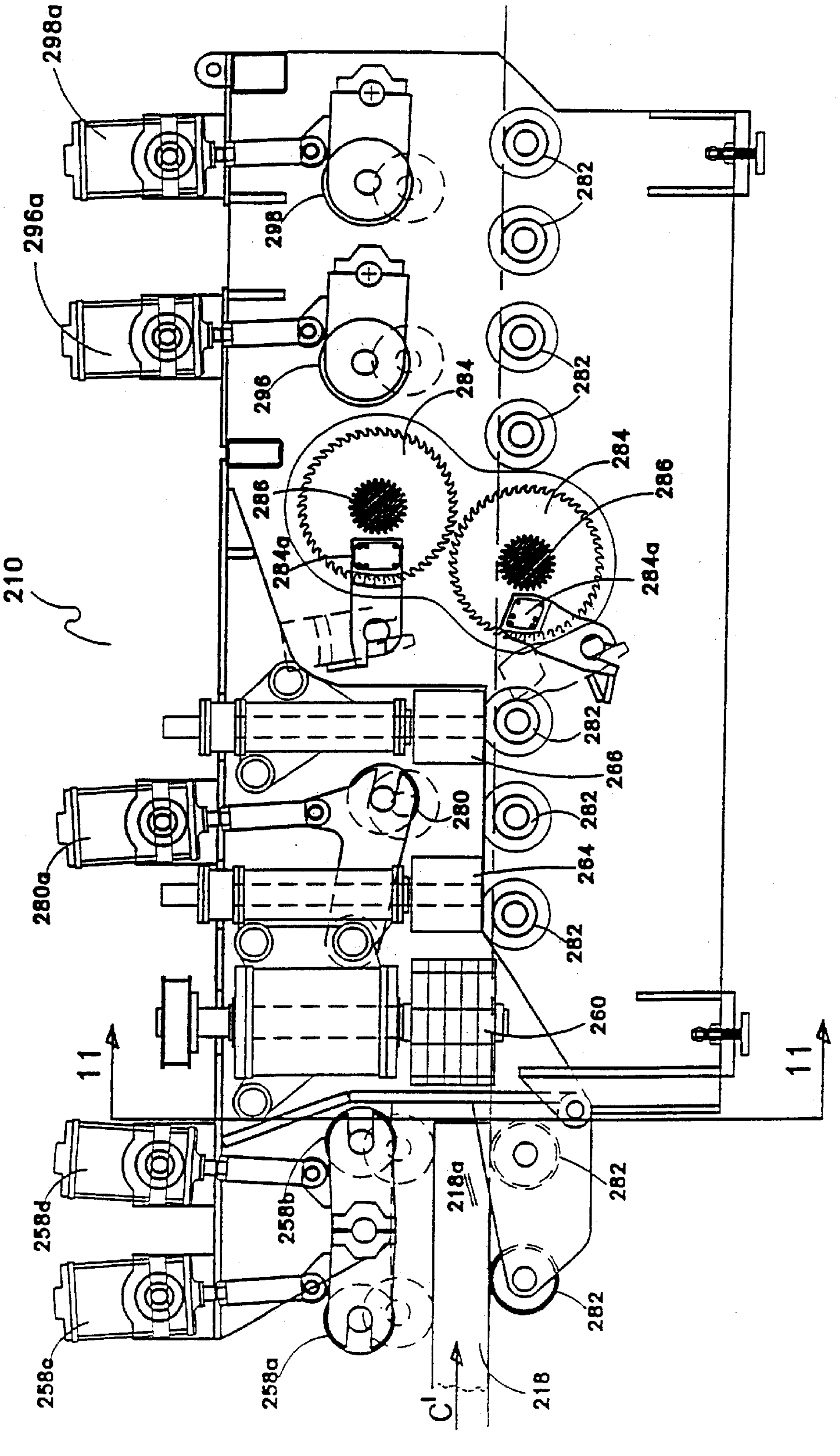
FIG. 10 is a side section view according to a preferred embodiment of the invention, along section line 10—10 in FIG. 12.
Figure 11:
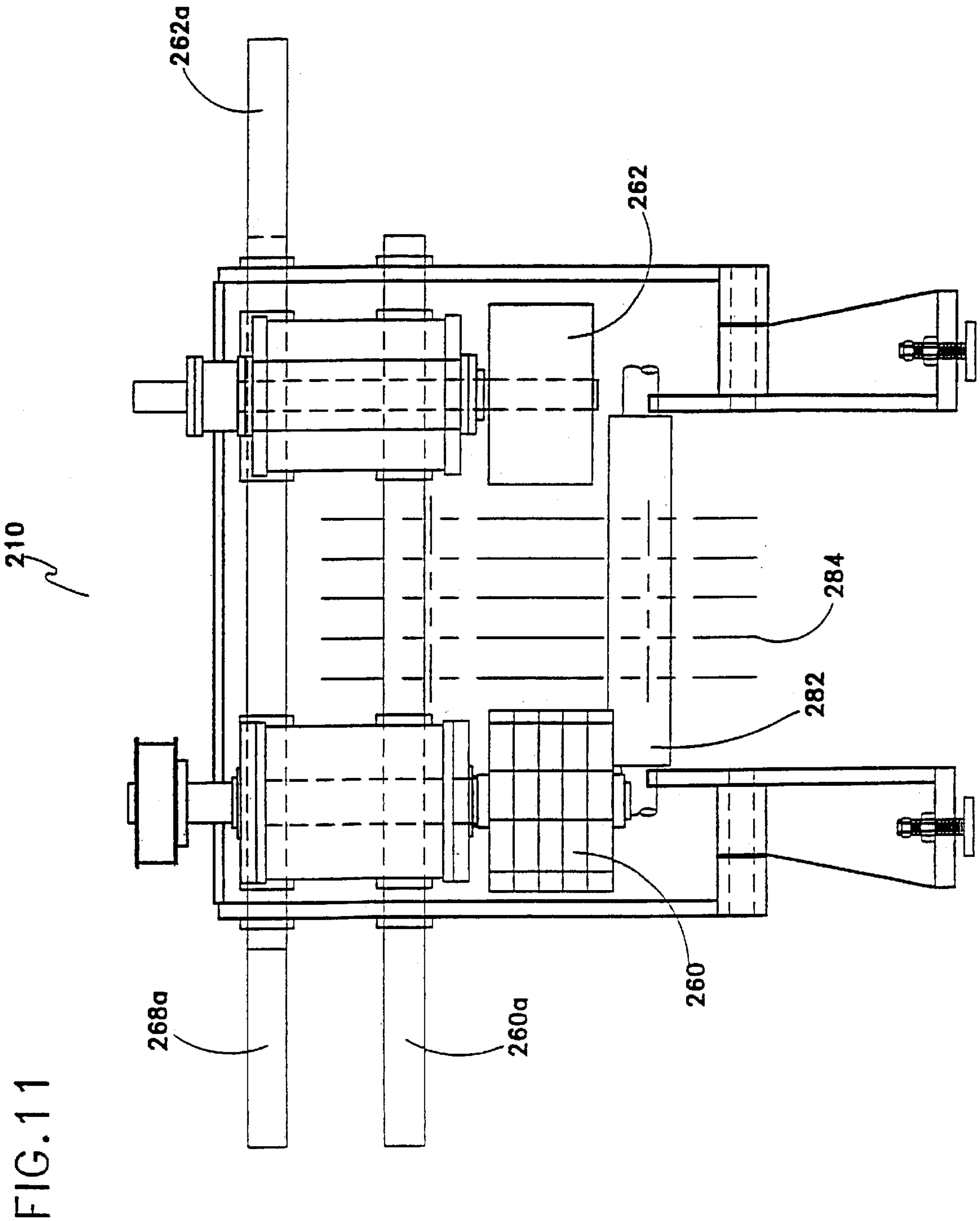
FIG. 11 is a fragmentary end section view according to a preferred embodiment of the invention, along section line 11—11 in FIG. 10.

The gang saw apparatus of the second mechanical embodiment is generally indicated by the reference numeral 210 and is best seen in FIGS. 10 and 11.

Figure 12:
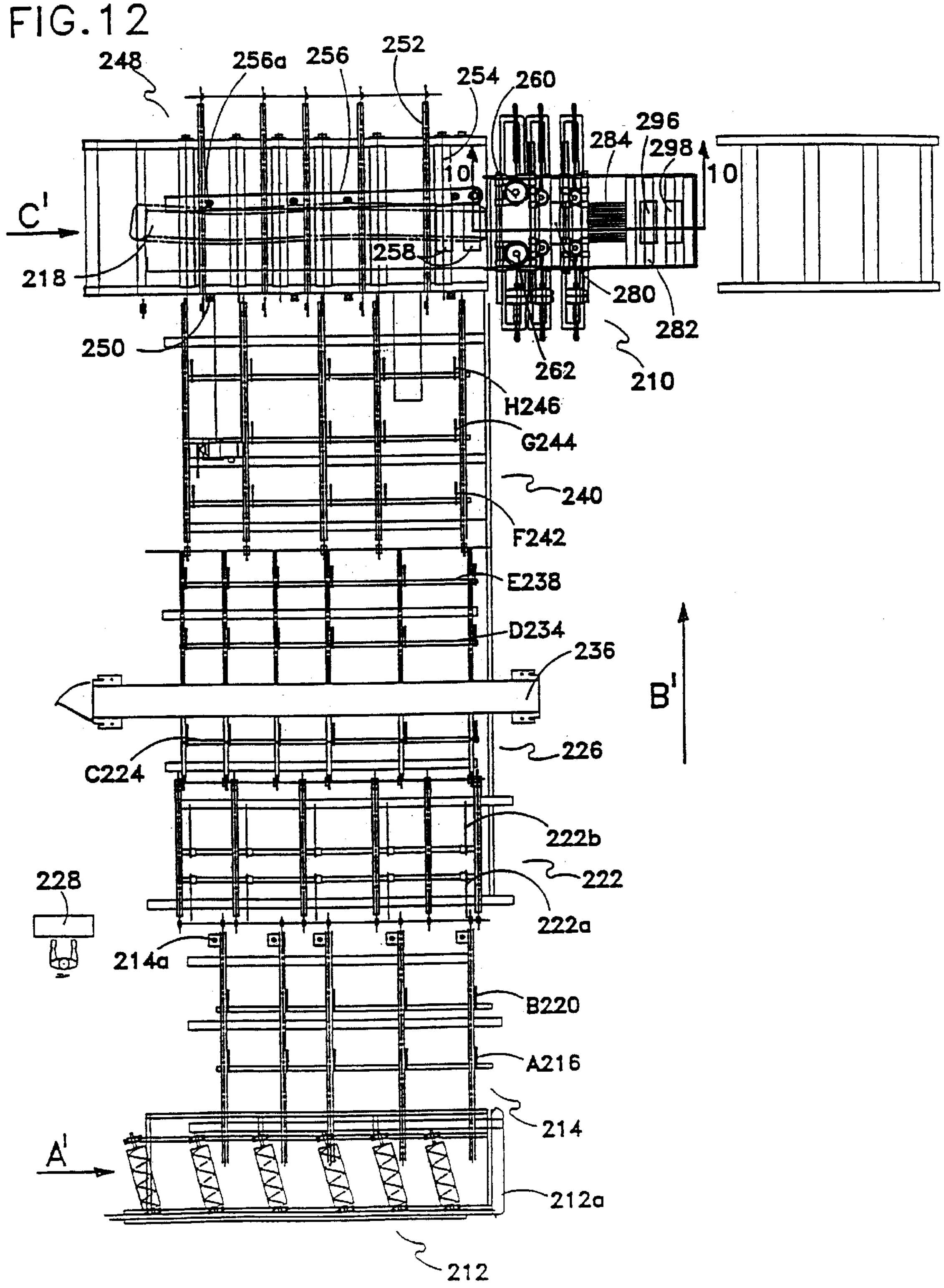
FIG. 12 is a plan view showing the curve sawing system.

As seen in FIG. 12, an ending roll case 212, having a live fence 212*a* receives cant 216 from the mill (direction A'). Cant 218 is transferred to a cant indexing transfers 214 (direction B'). Cant 218 is sequentially indexed by duckers A216, B210, C224, D234, and E238 on cant sequencing transfer 214, and by duckers F242, G244, and H246 on cant sequencing transfer 240. By wall of illustration of the sequencing: ducker A216 first receives cant 218, then, when a ducker B220 becomes available, cant 218 is sequenced from ducker A216 to ducker B220. Cant advances from ducker B220 to pin stops 214*a* when pin stops 214*a* become available. Cant turner 222 (not used with dual chipper drum system, see FIG. 14) is used to orient the cant for steering into the gang saw 210, if needed where the operator may elect to turn cant 218 with cant turner 222 before advancing cant 218 to ducker C224 on the scanner transfer 226. Cant turner 222 includes cant turner arms 222*a* and 222*b*. If cant 218 requires turning, then cant 218 is sequenced from ducker B220 to ducker C224, when ducker C224 becomes available. Ducker C224 is mounted on a scanner transfer 226. Scanner 236 scans cant 218 as it passes through the scanner.

When park zone pins 250 on positioning table 248 become available, cant 218 is sequenced from ducker H246 to park zone pins 250. When positioning table 248 becomes available, park zone pins 250 lower and a set of gangsaw table jumpchains 252 raise and move cant 218 from park zone pins 250 and position cant 218 over positioning table rolls 254 against a plurality of raised skew bar pins 256*a* on skew bar 256. Skew bar 256 is positioned according to the optimized profile to skew cant 218 for feeding in to gangsaw 210.

Driven pressroll 258*a* is actuated by corresponding pressroll cylinder 258*c*. Driven pressroll 258*b* is actuated by corresponding pressroll cylinder 258*d*. Pressrolls 256 press down to hold cant 218 against positioning table rolls 254. Skew bar pins 256*a* are lowered out of the path of cant 218 so that driven pressrolls 258*a* and 258*b* can drive cant 218 in direction C' between chipping drum 260 and opposing stabilizing roll 262. With reference to the travel path of cant 218 direction C' is the direction in which cant 218 moves from an upstream position, for example on the gangsaw positioning table, to a downstream position, for example, at chipping drum 260. Cant 218 continues in direction C' to engage driven steering roll 264 and driven guide roll 266 so as to pass between driven steering roll 264 and opposing non-driven crowding roll 268 and between driven guide roll 266 and crowding roll 270, whereby the leading end 218*a* of cant 218 is grasped between the powered steering roll 264 and the non-driven crowding roll 268.

Chipper drum 260 and the non-driven chipper stabilizing roll 262 are guided on guide shafts 260*a* and 262*a*, and selectively positioned by positioning cylinders 260*b* and 262*b*. Air bag 262*c* absorbs deviations on cant 218. Chipper stabilizing roll 262 helps to create a consistent pressure on the non chipping side of cant 218. This helps to prevent the chipper head 260's chipping directional forces from moving cant 218 in a different path than is desired.

Figure 14:
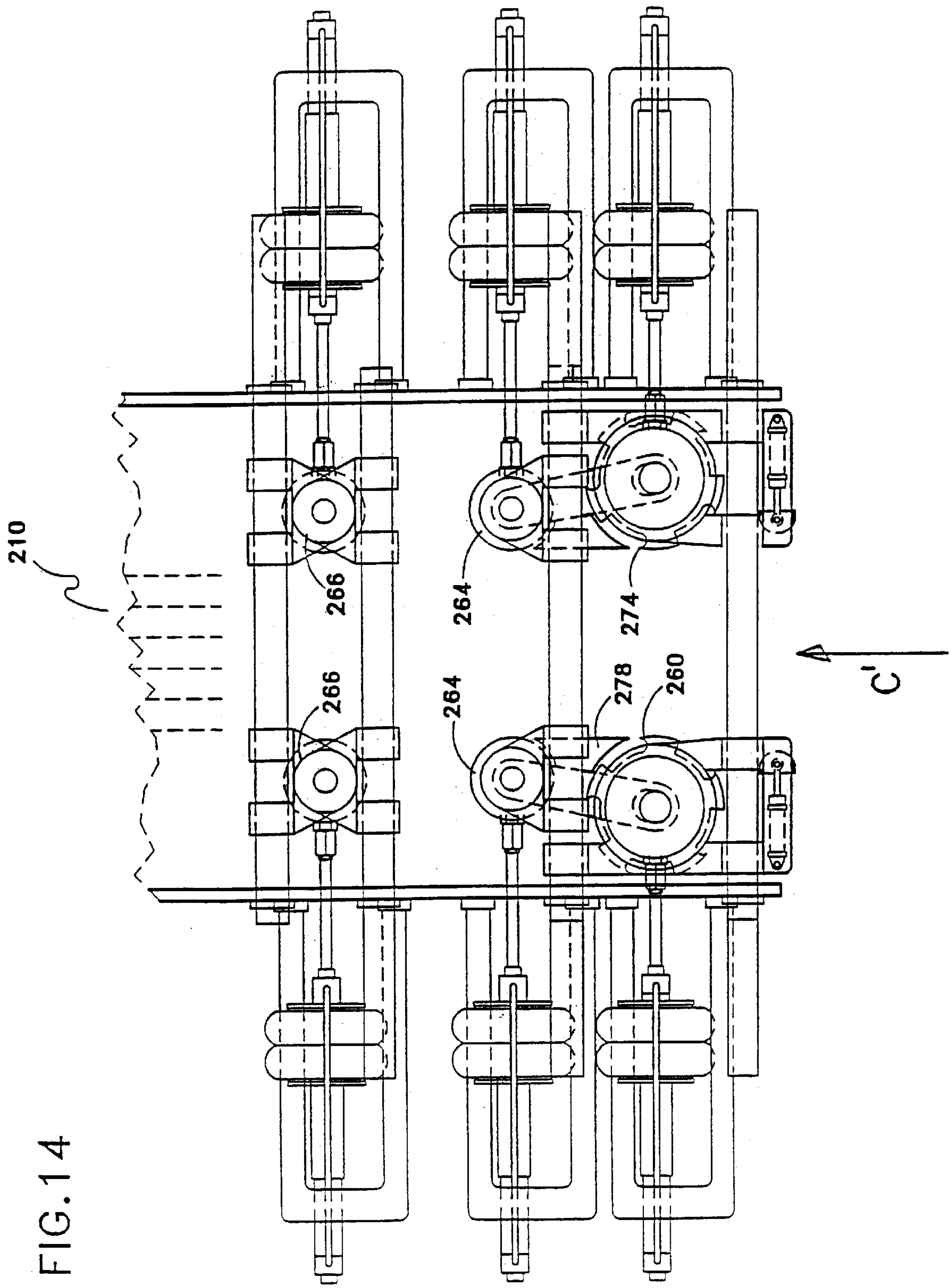
FIG. 14 is an enlarged, fragmentary plan view of an alternate embodiment showing two chipping drums, with the steering and guide rollers operable from either side.

Positioning guides 271 and 272 are actuated by hydraulic positioning cylinders 271*a* and 272*a*. Positioning guides 271 and 272 are situated just upstream of chipper drum 260 and opposing chipper stabilizing roll 262 respectively (or alternately chipper drum 214, as seen in FIG. 14). Positioning guides 271 and 272 are positioned to ensure precise positioning of the cant 218 just before cant 218 contacts chipper drum 260 and opposing chipper stabilizing roll 262. Positioning guides 271 and 272 are retracted once cant leading end 218*a* contacts steering roll 264. The positioning guides, chipping heads and steering rolls are actively positioned to attain the optimized cut profile.

Guide plate 278, which also acts as a chip deflector, is situated between and slidably attached to, chipping drum 260 and first steering roll 264. Guide plate 278 inhibits cant 218 from being gouged while the cant's leading end 218*a* is moving past chipping drum 260 and up to the first steering roll 264 and before cant 218 contacts guide roll 266. Chipping drum 260 is actively positioned to cut a modified polynomial curve as the third face of the cant according to the method depicted graphically in FIG. 4.

Driven pressrolls 258*a* and 258*b* lift up after the leading end 218*a* of cant 218 contacts the guide roll 266, and driven press roll 280, actuated by pressroll cylinder 280*a*, mounted above the path of cant 218 between steering roll 264 and guide roll 266 takes over to press cant 218 onto bed rolls 282 as the cant is grasped between guide roll 266 and crowding roll 270. Press roll 280 presses down on to cant 218 to keep cant 218 down on to bed rolls 282 as the leading end 218*a* of cant 218 enters saws 284. Saws 284 are mounted on splined saw arbors 286. Saws 284 are held in position by saw guides 284*a*.

Driven steering rolls 264 and driven guide roll 266 are guided by guide shafts 264*a* and 266*a*. Non-driven crowding rolls 268 and 270 are guided by guide shafts 268*a* and 270*a*. Driven steering roll 264 and driven guide roll 266 are driven by drive motors (not shown), and positioned by linear positioning cylinders 288 and 290 respectively. Non-driven crowding rolls 268 and 270 are positioned by linear positioning cylinders 292 and 294 respectively. Air bags 292*a* and 294*a* are provided to absorb shape anomalies on cant 218.

Cant 218, in the form of boards being cut from cant 218 by saws 284, is transported through gangsaw 210, driven and held by driven press rolls 296, and driven press roll 298, actuated by pressroll cylinders 296*a* and 298*a*, respectively, mounted near the outfeed end of the gangsaw 210. These press rolls may be fluted, that is, have friction means, to provide traction while still allowing some sideways movement of cant 218 (now boards) as cant 218 moves through and out of the gangsaw 210, and thence onto outfeed rollcase 299.

In an alternative embodiment, as seen in FIG. 14, chipper 260 and steering side mechanism (264, 266) could be duplicated on the opposing side of the cant transfer path. An opposed second chipper drum 274 permits chipping and steering from both sides of cant 218. This eliminates a cant turner before the scanner. Air bags would advantageously be provided on all positioning cylinders. The air bags would be disengageable so as to become solid cylinder rams on the opposite side of the rolls that are steering at any given time.

Figure 15:
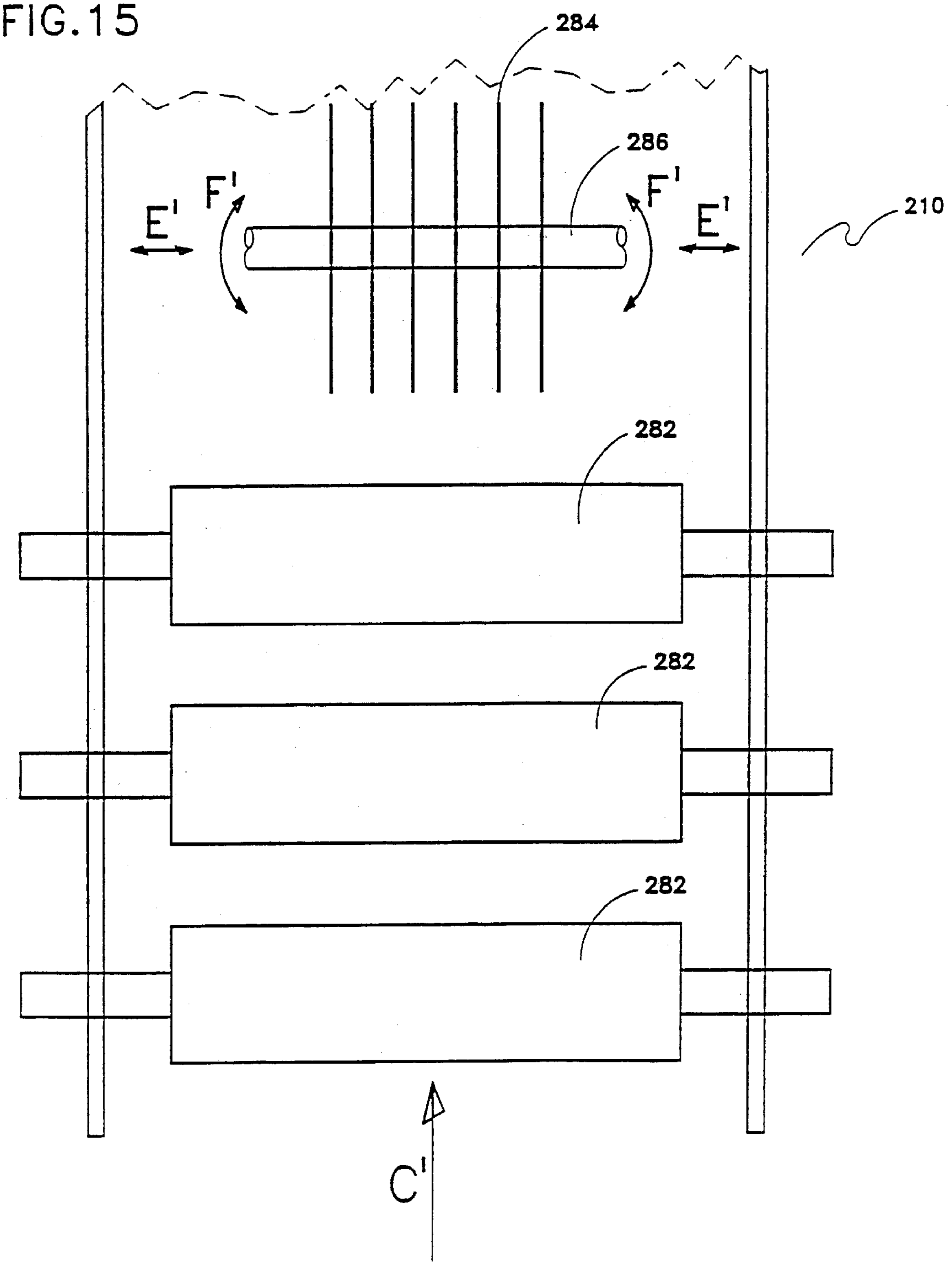
FIG. 15 is an enlarged, fragmentary, diagrammatic plan view of a further alternate embodiment for skewing and translating saws and saw arbor.
Figure 16:
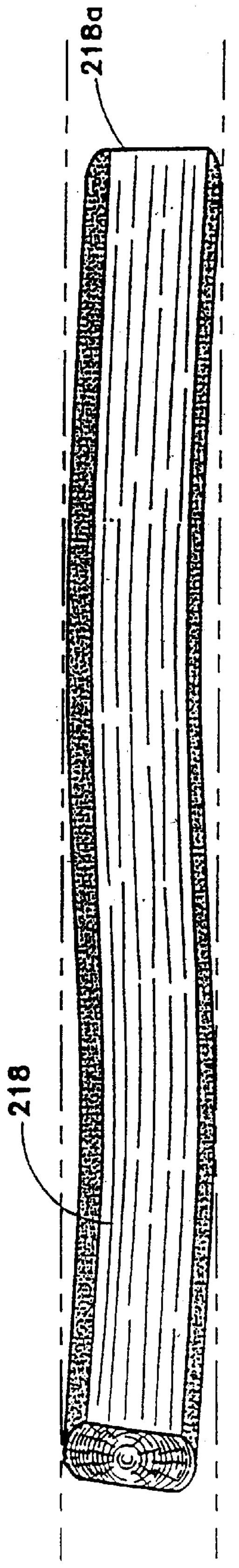
FIG. 16 is a perspective view of a two sided curved cant.
Figure 16A:
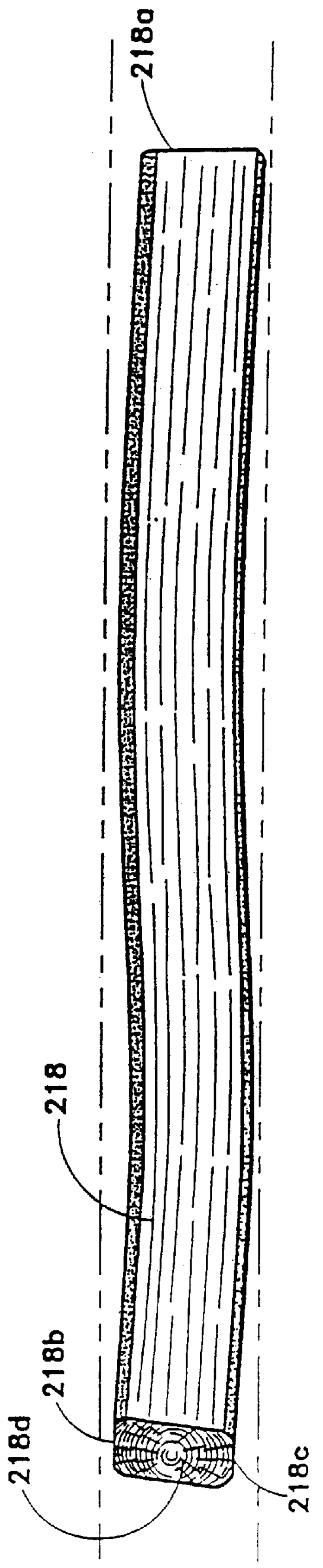
FIG. 16*a* is a perspective view of a four-sided curved cant.

A further alternative embodiment, seen in FIG. 15, has skewing and translating saws and saw arbor. Bed rolls 282 and overhead press rolls (not shown) hold the cant down onto bed rolls 282 and move cant 218 in a straight line all the way through the gangsaw while the saws 284 and arbor 286 move to create the curved optimized profile.

Third Mechanical Embodiment

Figure 17:
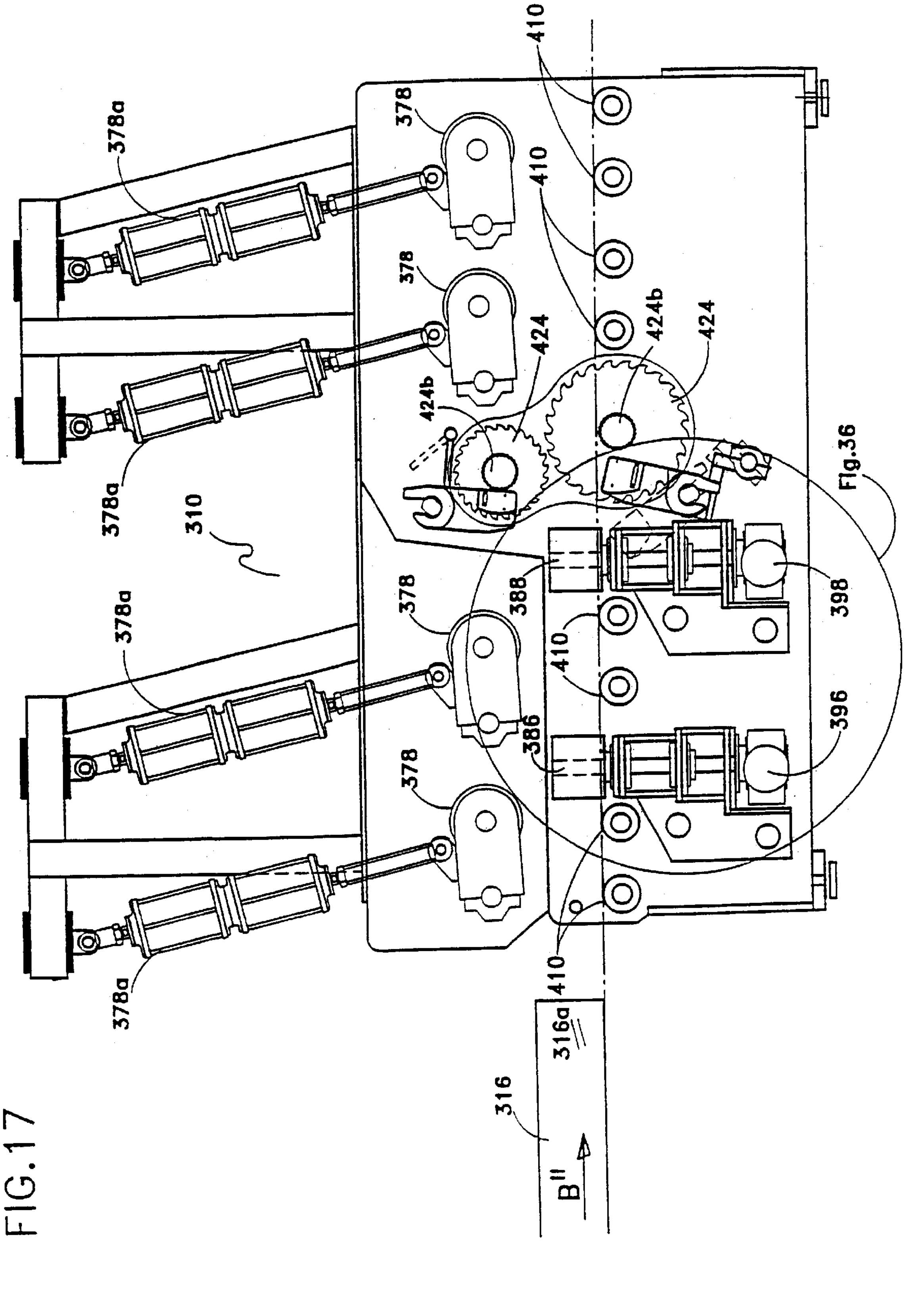
FIG. 17 is a side elevation view according to a preferred embodiment of the invention.
Figure 19:
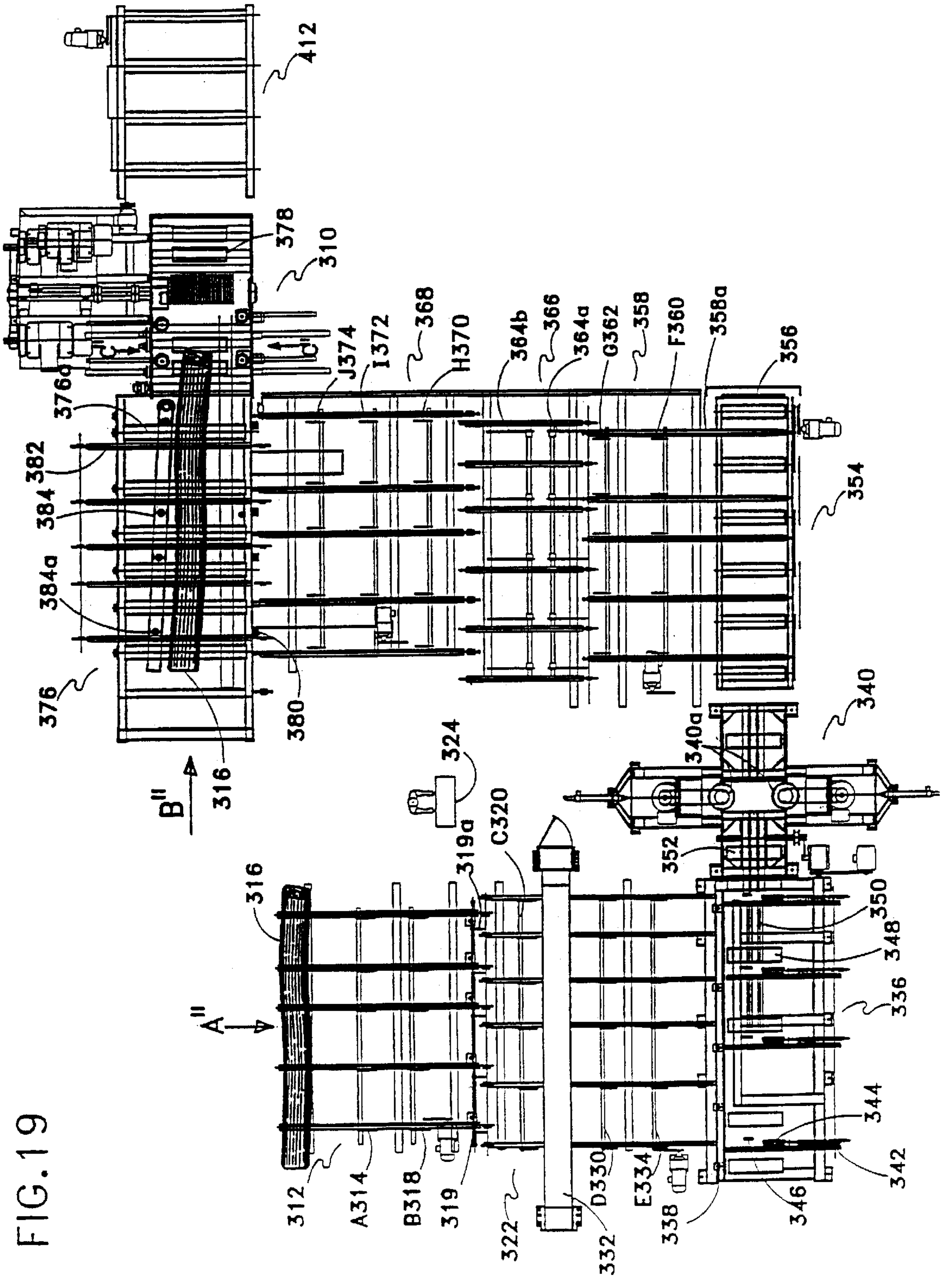
FIG. 19 is a plan view showing the profiler and curve sawing line.

The gang saw apparatus of the third mechanical embodiment is generally indicated by the reference numeral 310 and is seen in FIGS. 17 and 19.

As illustrated in FIG. 19, a cant 316 is indexed along cant indexing transfer 312, scanner transfer 322, jump chain transfer 358, and cant sequencing transfer 368 by duckers A 314, B318, C320, D330, E334, F360, G362, H370, I372, and J374. Then when a ducker B 318 on the cant indexing transfer 312 becomes available the cant 316 is sequenced from ducker A 314 to ducker B 318.

Following ducker B 318, a cant turner 319, which includes cant turner ducker 319*a*, is located where an operator may elect to turn cant 316 before advancing the cant to ducker C 320 on the scanner transfer 322. Scanner 322 is located between duckers C 320 and D 330 on the scanner transfer 322. Profile positioning table 336 has park zone pins 338. When park zone pins 338 become available on profiler positioning table 336, cant 316 is sequenced from ducker E 334 to park zone pins 338. Profiler positioning table 336 takes cant 316 from park zone pins 338 and positions the cant for feeding to profiler 340. A plurality of jump chains 342 on profiler positioning table 336 run substantially perpendicular to the flow through profiler 340. Positioners 344 extend, also substantially perpendicular to the profiler flow, to align cant 316 for passing through the profiler 340. As cant 316 enters profiler positioning table 336 selected crowder arms 346 are activated as required to ensure cant 316 is in position against positioners 344.

Holddown rolls 348 hold cant 316 onto a sharp chain 350. As the leading end 316*a* of cant 316 enters profiler 340, pressrolls 352 lower in sequence to hold cant 316. Opposed chip heads 340*a* cut vertical faces 316*b* and/or 316*c*.

Cant 316 leaves profiler 340 on profiler outfeed rollcase 354. Rollcase 354 has ending bumper 356. Cant 316 leaves profiler outfeed rollcase 354 to cant jumpchain transfer 358. Cant turner arms 364*a* and 364*b* are provided downstream of jumpchain transfer 358. If cant 316 requires turning, cant turner arms 364*a* and 364*b* rotate, turning the cant 316. From the cant turner, cant 316 is transferred along cant sequencing transfer 368.

Gangsaw positioning table 376 includes park zone pins 380 and positioning table rolls 376*a*. When park zone pins 380 become available, cant 316 is sequenced from ducker J 374 to park zone pins 380. Park pins 380 are lowered and a set of gangsaw table jumpchains 382 take cant 316 from park zone pins 380 and position the cant against a plurality of raised skew bar pins 384*a* on skew bar 384. Skew bar 384 skews cant 316 into alignment for feeding to gangsaw 310.

Figure 18:
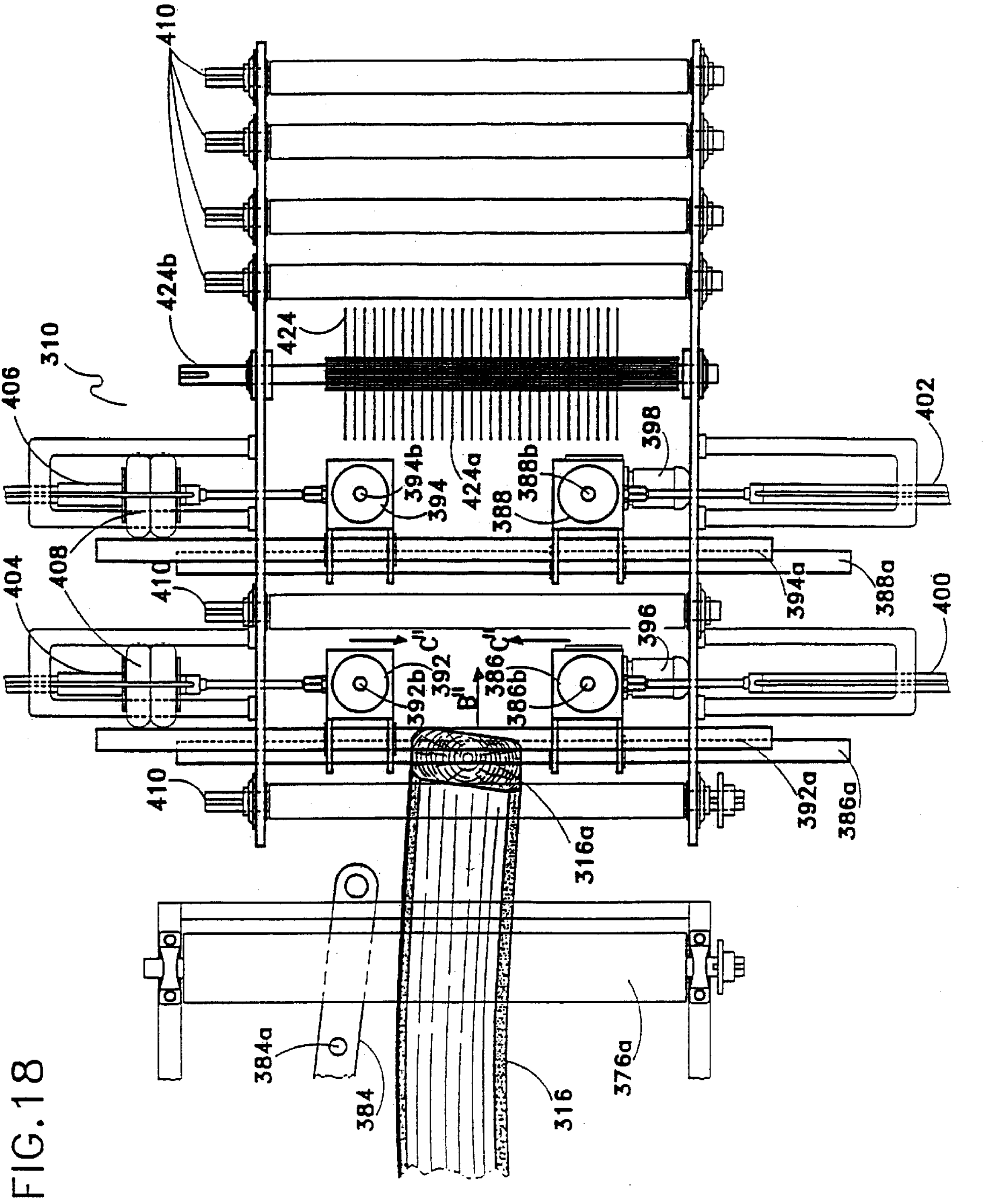
FIG. 18 is a plan view according to the preferred embodiment of FIG. 17.

Cant 316 moves in direction B" on positioning rolls 376*a* to a position between a set of driven steering rolls 386, 388 and a set of non-driven crowding rolls 392 and 394 as seen in FIG. 18. As the leading end 316*a* of cant 316 enters gangsaw 310, pressrolls 378, by means of pressroll cylinders 378*a*, press down to hold cant 316 as cant 316 passes into the sawblades 424 mounted on saw arbors 424*b*. The lateral position of the two driven steering rolls 386 and 388 are guided by guide shafts 386*a* and 388*a*. The two non-driven crowding rolls 392 and 394 are similarly laterally guided on guide shafts 392*a* and 394*a*. The two steering rolls 386 and 388 are rotatably driven on shafts 386*b* and 388*b* by drive motors 396 and 398 for driving the rotation of steering rolls 386 and 388 via drive shafts 386*b* and 388*b*, and laterally selectively positioned by positioning cylinders 400 and 402. The two non-driven crowding rolls 392 and 394 are mounted on idler shafts 392*b* and 394*b* and are laterally positioned by positioning cylinders 404 and 406. Air bags 408 are provided to absorb anomalies in the profiled face. The gangsaw 310 includes bedrolls 410. The cant 316 (now sawed into boards) leaves the gangsaw 310 on the gangsaw outfeed rollcase 412.

The method of operation is seen in FIGS. 1 and 19. In operation, cant 316 such as depicted in FIG. 34 enters the system from a headrig rollcase (not shown), is ended against a bumper (not shown) and is then transferred in direction A" to ducker A314. When ducker B 318 becomes available cant 316 is sequenced from ducker A 314 to ducker B 318 on the cant indexing transfer 312. Ducker B 318 is normally down.

The cant will advance from ducker B 318 to cant turner 319 (the cant turner ducker 319*a* is normally up) where an operator may elect to turn the cant 316, before advancing the cant to ducker C 320 on the scanner transfer 322. Ducker C 320 is normally up. Any operator entries relating to the cant about to be scanned must be made before the cant leaves ducker C 320. Just before ducker C 320 is lowered to advance the cant, the operator inputs (specification choices, grade choices, straight cut & test cant if needed) are entered on the operator console 128 passed to the PLC 18 and then communicated to the optimizer 24 over communications link 27.

Between ducker C 320 and ducker D 330 scanner 332 (labelled as scanner 14 in FIG. 1) will scan the cant and transmit measurement data over local area network 26 to optimizer 24 for use in the modelling and optimization process. Encoder 43 on the scanner transfer 322 provides timing pulses to track both forward and backward movement of the cant.

Three dimensional modelling and real-time optimization processing takes place in the optimizer 24 as the cant is moving through the scanner and prior to its delivery to profiler 340. In FIG. 1, active chip heads 38 and 40 in sawbox 16, immediately upstream of saws 52 are substituted for profiler 340, although an additional upstream cant reducer may be provided to remove butt flare. A curve sawing algorithm, using measurement data from the processed scanner data models the cant and plots a complex “best” curve related to the contours of the wood, smooths surface irregularities in plotted curve (see FIG. 4), selects an optimum cut description based on product value, operator input and mill specifications and generates control information to effect the cutting solution. Various parameters, such as minimum radius and maximum angle from center line are provided to conform to physical constraints. Control information relating to the positioning and movement of the cant is communicated back to PLC 18 for implementation at the various downstream machine centers which will both profile the cant according to the optimized curve and cut the cant into the products of the selected cut description.

Ducker D 330 is normally down. When ducker E 334 becomes available the cant is sequenced from ducker D 330 to ducker E 334 on the scanner transfer 322. Ducker 334 is normally down. Curve, skew and cutting description control data is transferred with the cant as it moves through the various stages. When the profiler positioning table park zone becomes available, the cant is sequenced from ducker E 334 to the park zone pins 338. The park zone pins 338 are normally up.

The profiler positioning table park pins 338 lower and the profiler positioning table 336 takes the cant from the park zone pins 338 and positions the cant for feeding to the profiler 340. PLC 18 communicates the decision information to the profiler motion controller 20. The jump chains 342 run forward and PLC 18 controls selected positioners 344 which extend to align the cant according to its predetermined location and skew angle control data. As the cant enters the profiler positioning table 336 the selected crowder arms 346 activate to ensure the cant's position against the positioners 344, and the park pins 338 raise.

The cant is detected against the positioners 344 and the holddown roll 348 lower and the jump chains 342 stop. The crowder arms 346 and positioners 344 retract and the jump chains 342 lower the cant onto the sharp chain 350.

As the leading end of the cant enters the profiler 340, the pressrolls 352 lower in sequence to hold the cant firmly in position as it passes each respective pressroll 352. Once the cant is sensed to be within the cutting vicinity, the motion controller 20 begins to execute the PLC commands to create the optimum profile. As the cant moves in a straight path through the profiler 340, the chipping heads 340*a* move horizontally and interdependently in tandem, substantially perpendicular to the direction of flow. The position of the cant is sensed by synchronization photoeye 46 and tracked by encoder 43. As the trailing end of the cant leaves the profiler positioning table 336, the holddown rolls 348 raise and jumpchains 342 raise. Also, as the trailing end of the cant leaves the profiler 340, the pressrolls 352 raise and the motion controller 20 ends its profile.

Figure 20:
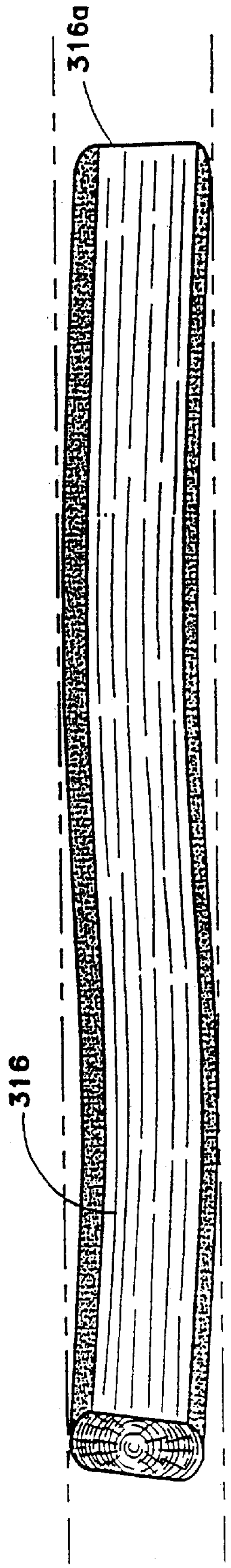
FIG. 20 is a perspective view of a two sided curved cant.
Figure 20A:
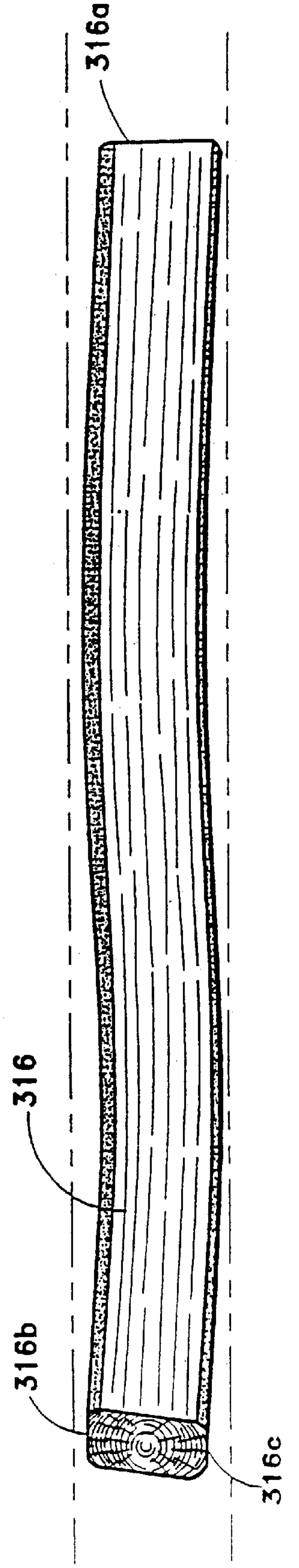
FIG. 20*a* is a perspective view of a four sided cant with optimized curved vertical faces.

The cant leaves the profiler 340 on the profiler outfeed rollcase 354 with at least one of the "profiled" vertical surfaces 316*b* and 316*c* (shown in FIG. 20*a*) that conform to the calculated best curve. The cant is ended against the ending bumper 356 and if ducker F 360 is available the appropriate cant transfer jumpchains 358*a* are raised (based on scanned length) to carry the cant from the profiler outfeed rollcase 354 to ducker F 360 on the cant jumpchain transfer 358. Ducker F 160 is normally down. When ducker G 362 becomes available the cant is sequenced from ducker F 360 to ducker G 362 on the cant jumpchain transfer. Ducker G 362 is normally up.

When the cant turner transfer 366 becomes available the cant is sequenced from ducker G 362 to the cant turner transfer 366. If the cant requires turning in order to place the appropriate side of the cant (either 316*b* or 316*c*) against the skew bar 384, the cant turner arms 364*a* and 364*b* will move to the mid-position (arms just above chain level), the cant will advance to the cant turner arms 364*a* and 364*b* and the cant turned acknowledge lamp and buzzer (not shown) will come on to request the operator to observe the actual turning of the cant. The operator pushes the cant turned acknowledge push-button (not shown) and the cant turner arms 364*a* and 364*b* will turn the cant.

When the turn is complete the cant turner transfer 366 will be stopped and the cant turn acknowledge lamp and buzzer (not shown) will again enunciate. The operator pushes the cant turned acknowledge push-button (not shown) again and the cant turner transfer 366 will re-start and advance the cant to ducker H 370 if that ducker is available. If the cant does not require turning, the cant will advance to the photoeyes and then the cant turner transfer 366 will stop. When ducker H 370 becomes available the cant turner transfer 366 re-starts and advances the cant to ducker H 370. Ducker H 370 is normally down. When ducker I 372 becomes available the cant will be sequenced from ducker H 370 to ducker I 372 on the cant sequencing transfer 368. Ducker I 372 is normally down. When ducker J 374 becomes available the cant will be sequenced from ducker I 372 to ducker J 374 on the cant sequencing transfer 368. Ducker J 374 is normally down.

When the gangsaw positioning table park zone pins 380 available the cant will be sequenced from ducker J 374 to the part zone pins 380. The park zone pins 380 are normally up. The park pins 380 lower and the gangsaw table jumpchains 382 take the cant from the park zone pins 380 and position it against the skew bar pins 384. The gangsaw table jumpchains 382 are controlled by PLC 18 to position the skew bar pins 384 on the correct optimized skew angle and place the skewed cant in front of the saw combination in the gangsaw that was selected to give the optimum cutting combination. This is a pre-positioning stage for presenting the cant to the steering rolls 386 and 388 and crowding rolls 392 and 394. Steering rolls 386 and 388 and crowding rolls 392 and 394 are pre-positioned with a slightly larger gap between them than the known width of leading edge of the cant to facilitate loading the cant.

Figure 21:
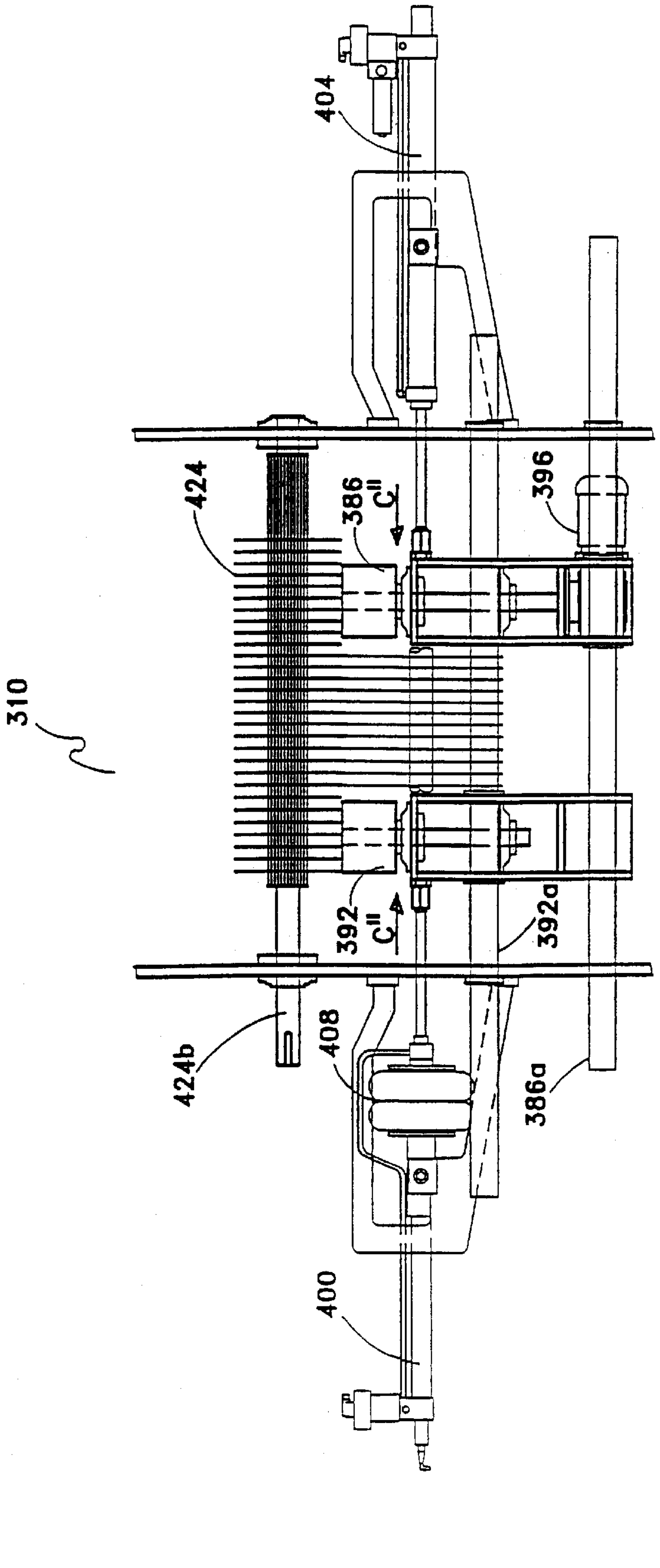
FIG. 21 is an end elevation view according to the preferred embodiment of FIG. 18.
Figure 22:
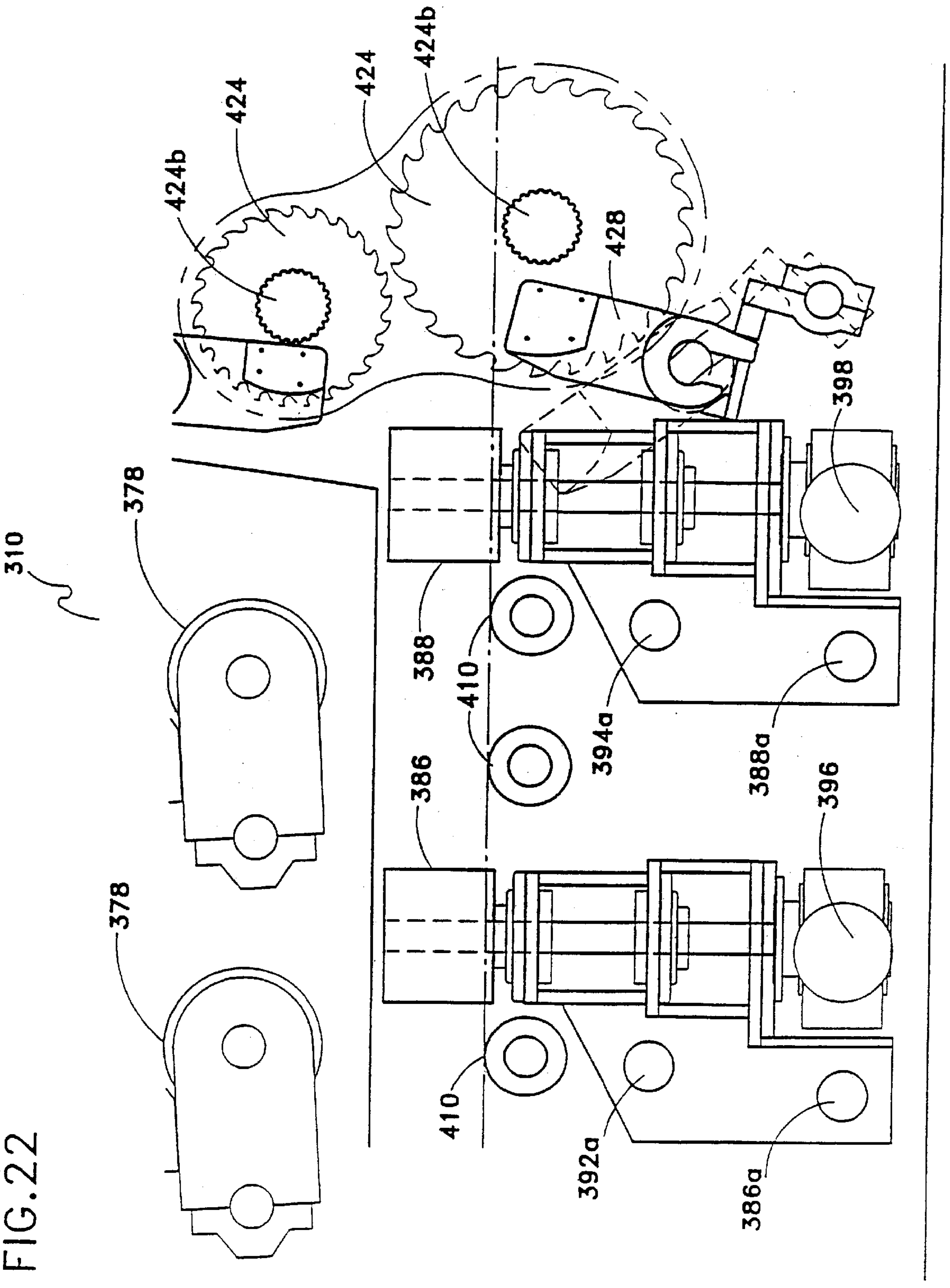
FIG. 22 is an enlarged, fragmentary, side elevation view from FIG. 17.

The gangsaw table jumpchains 382 stop, the skew bar pins 384 retract and PLC 18 communicates decision information to the gangsaw motion controller 22. As the leading end of the cant enters the gangsaw 310 (gangsaw 16 in FIG. 1), the pressrolls 378 lower in sequence to hold the cant as it passes under each pressroll 378. As the cant approaches the saws 424 (saws 52 in FIG. 1) the motion controller 22 closes the gap in direction C", between the steering and crowding rolls, and positions the two driven steering rolls 386 and 388 according to the profile determined by optimizer 24. The two non-driven crowding rolls 392 and 394 now engage into a pressure mode and are applied to provide a counter force on the cant opposing the two powered steering rolls 386 and 388. The pressure applied by the crowding rolls 392 and 394 follows a profile determined by optimizer 24. The pressure mode ensures that the cant 16 remains in contact with the steering rolls 386 and 388 while allowing for anomalies in the cant surface 316*a* and 316*b* by means of airbags 408 (see FIG. 21). The position of the cant as it passes through the gangsaw is sensed by a photoeye and encoder 43.

With a curved cant the steering rolls 386 and 388 and the two non-driven crowding rolls 392 and 394 adjust their positions as the cant is being fed into the gangsaw. This position follows the profile that is sent to the motion controller 22 from optimizer 24 so as to feed the cant into the saw blades with the cant's vertical face 316*c* remaining substantially laterally stationary relative to the gangsaw at the saw blade's first contact point 424*a* (see FIG. 18, looking in direction B"). While the cant's face 316*c* remains substantially stationary relative to a horizontal direction perpendicular to direction B" at the saw blade's first contact point 424*a*, the rear portion of the cant is in longitudinal motion and in lateral motion depending on the curve of the cant as the cant is being fed into and cut by the saw blades. The boards being formed begin to follow a slightly different path than the cant allowing the saw blades 424 to remain in a fixed position held by the gangsaw guides 428. As the trailing end of the cant leaves the gangsaw positioning table 376, the jumpchains 382 raise. As the trailing end of the cant passes under each pressroll 378, each will raise in sequence so as not to roll off the end of the cant. Also, as the trailing end of the cant (now boards) leaves the gangsaw, the motion controller 22 ends its profile. The crowder rolls 392 and 394 and the steering rolls 386 and 388 retract so as not to run off the end of the cant. The boards (not shown), which now match the optimized cutting solution that was generated as the cant was being scanned, leave the gangsaw on the gangsaw outfeed rollcase 410. The boards are transported by these rolls to the gang outfeed landing table (not shown).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

SMOOTHING AND GENERATION OF CURVE

The process of generating a curve and smoothing the data is done in three steps.

1. From the discrete laser readings, generate an nth degree polynomial of the format:

$$f(x)=\alpha_n x^n+\alpha_{n-1}x^{n-1}+ \ldots +\alpha_1 x+\alpha_0$$

2. From the polynomial, calculate new discrete points at the same laser locations.
3. Apply the curve sawing constraints to the discrete points:
   maximum angle from center line;
   maximum radius

What is claimed is:

1. A method of position-based curve sawing of a workpiece having a longitudinal axis with a machine having a cutting device, said method comprising:

(a) obtaining scanning data of said workpiece to determine a series of profiles of said workpiece along the longitudinal axis of said workpiece;

(b) computing a smoothing curve fitted to said series of profiles of said workpiece, and adjusting said smoothing curve in accordance with physical machine constraints of said cutting device to generate an adjusted curve wherein said machine constraints are parameters which include minimum radius and maximum angle from a center line of said cutting device;

(c) generating a set of positioning data based upon said adjusted curve corresponding to desired relative positions of said cutting device and said workpiece;

(d) adjusting the relative position of said cutting device and said workpiece according to said set of positioning data as said workpiece is fed into cutting engagement with said cutting device.

2. A curve sawing device comprising:

(a) a base;

(b) an articulated gangsaw mounted to a carriage, said carriage mounted to said base;

(c) a chipping head mounted to said carriage and cooperating with said gangsaw;

(d) said chipping head being translatable in a first direction which crosses a linear workpiece feed path wherealong said workpiece may be linearly fed so as to first pass said chipping head and subsequently pass through said gangsaw; and (e) first positioning means for positioning said chipping head linearly in said first direction to thereby translate said chipping head relative to said workpiece feed path and for positioning said gangsaw linearly in said first direction, and (f) second positioning means for rotatably positioning said gangsaw about a generally vertical axis to thereby simultaneously translate and skew said gangsaw carriage relative to said workpiece feed path.

3. A method of profiling at least a third face of a cant having a longitudinal axis and of position-based curve sawing of the cant with a machining center and a cutting device respectively, said method comprising the steps of:

(a) obtaining scanning data of said cant to determine a series of profiles of said cant along the longitudinal axis of the said cant;

(b) computing a smoothing curve fitted to said series of profiles of said cant, and adjusting said smoothing curve to limit excessive angles during profiling by said machining center caused by scars, knots or branch stubs in said at least said third face of said cant, and adjusting said smoothing curve in accordance with physical machine constraints of said cutting device to generate an adjusted curve wherein said machine constraints are parameters which include minimum radius and maximum angle from a center line of said cutting device;

(c) generating positioning data based upon said adjusted curve corresponding to desired relative positions of said machining center and said cant and between said cutting device and said cant;

(d) adjusting the relative position of said machining center and said cant according to said positioning data as said cant is fed into profiling engagement with said machining center so as to profile at least said third face of said cant, and adjusting the relative position of said cutting device and said cant according to said positioning data as said cant is thereafter fed into cutting engagement with said cutting device.

4. A method of profiling with a machining center at least a third face of a cant having a longitudinal axis, said method comprising the steps of:

(a) obtaining scanning data of said cant to determine a series of profiles of said cant along the longitudinal axis of the said cant;

(b) computing a smoothing curve fitted to said series of profiles of said cant, and adjusting said smoothing curve to generate an adjusted curve so as to limit excessive angles during profiling by said machining center caused by scars, knots or branch stubs in said at least said third face of said cant;

(c) generating positioning data based upon said adjusted curve corresponding to desired relative positions of said machining center and said cant;

(d) adjusting the relative position of said machining center and said cant according to said positioning data as said cant is fed into profiling engagement with said machining center so as to profile at least said third face of said cant.

5. The method of claim 3 wherein said at least said third face of said cant includes said third face and an opposite fourth face of said cant.

6. The method of claim 4 wherein said at least said third face of said cant includes said third face and an opposite fourth face of said cant.

7. The method of claim 3 wherein said machining center is at least one chipping head.

8. The method of claim 4 wherein said machining center is at least one chipping head.

9. The method of claim 3 wherein said machining center is at least one saw.

10. The method of claim 4 wherein said machining center is at least one saw.

11. An apparatus for profiling at least a third face of a cant having a longitudinal axis and of position-based curve sawing of the cant, said apparatus comprising:

(a) a machining center for profiling at least a third of the cant:

(b) a cutting device for curve sawing of the cant;

(c) a scanner for obtaining scanning data of said cant to determine a series of profiles of said cant along the longitudinal axis of the said cant;

(d) a processor programmed for:

(i) computing a smoothing curve fitted to said series of profiles of said cant, and for computing an adjusted curve by adjusting said smoothing curve to generate an adjusted curve so as to limit excessive angles during profiling by said machining center caused by scars, knots or branch stubs in said at least said third face of said cant, and by adjusting said smoothing curve in accordance with physical machine constraints of said cutting device wherein said machine constraints are parameters which include minimum radius and maximum angle from a center line of said cutting device, and, (ii) generating positioning data based upon said adjusted curve corresponding to desired relative positions between said machining center and said cant, and between said cutting device and said cant;

(e) translation means for feeding said cant from said scanner and through said machining center and said cutting device;

(f) means for adjusting the relative position of said machining center and said cant according to said positioning data as said cant is fed into profiling engagement with said machining center so as to profile at least said third face of said cant;

(g) means for adjusting the relative position of said cutting device and said cant according to said positioning data as said cant is fed into cutting engagement with said cutting device.

12. An apparatus for profiling at least a third face of a cant having a longitudinal axis, said apparatus comprising:

(a) a profiling machining center;

(b) a scanner for obtaining scanning data of said cant to determine a series of profiles of said cant along the longitudinal axis of the said cant;

(c) a processor programmed for:

(i) computing a smoothing curve fitted to said series of profiles of said cant, and for computing an adjusted curve by adjusting said smoothing curve to limit excessive angles during profiling by said machining center caused by scars, knots or branch stubs in said at least said third face of said cant;

(ii) generating positioning data based upon said adjusted curve corresponding to desired relative positions of said machining center and said cant;

(d) translation means for feeding said cant from said scanner and through said machining center;

(e) means for adjusting the relative position of said machining center and said cant according to said positioning data as said cant is fed into profiling engagement with said machining center so as to profile said at least said third face of said cant.

13. The apparatus of claim 11 wherein said at least said third face of said cant includes said third face and an opposite fourth face of said cant.

14. The apparatus of claim 12 wherein said at least said third face of said cant includes said third face and an opposite fourth face of said cant.

15. The apparatus of claim 11 wherein said machining center is at least one chipping head.

16. The method of claim 12 wherein said machining center is at least one chipping head.

17. The apparatus of claim 11 wherein said machining center is at least one saw.

18. The apparatus of claim 12 wherein said machining center is at least one saw.

19. A curve sawing device comprising:

an articulated curve sawing gangsaw and a cant profiler mounted upstream of said gangsaw, said cant profiler for cutting at least a third face from a cant translating along a workpiece feed path into said profiler and subsequently along said workpiece feed path into said articulated curve sawing gangsaw, wherein said profiler cuts said third face according to an optimized adjusted curve so that said third face on said cant can be accurately guided into said curve sawing gangsaw, and wherein said optimized adjusted curve is a smoothing curve fitted to a series of scanned profiles of said cant and adjusted in accordance with physical machine constraints of said articulated curve sawing gangsaw as determined by a means for computing said adjusted curve, where said machine constraints are parameters which include minimum radius and maximum angle from a center line of said cutting device; wherein said cant profiler is translatable in a first direction which crosses said workpiece feed path, first positioning means for positioning said profiler linearly in said first direction to thereby translate said profiler relative to said workpiece feed path and second positioning means for positioning said gangsaw linearly across said workpiece feed path in a direction parallel to said first direction, and for rotatably positioning said gangsaw about a generally vertical axis to thereby simultaneously translate and skew said gangsaw relative to said workpiece feed path.

* * * * *